United States Patent
Ruehl et al.

(10) Patent No.: US 9,904,756 B1
(45) Date of Patent: Feb. 27, 2018

(54) METHODS, SYSTEMS, AND COMPUTER PROGRAM PRODUCT FOR IMPLEMENTING DRC CLEAN MULTI-PATTERNING PROCESS NODES WITH LATERAL FILLS IN ELECTRONIC DESIGNS

(71) Applicant: CADENCE DESIGN SYSTEMS, INC., San Jose, CA (US)

(72) Inventors: Roland Ruehl, San Carlos, CA (US); Alexandre Arkhipov, San Jose, CA (US); Giles V. Powell, Alameda, CA (US); Karun Sharma, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 203 days.

(21) Appl. No.: 14/675,516

(22) Filed: Mar. 31, 2015

(51) Int. Cl.
| | |
|---|---|
| *G06F 17/50* | (2006.01) |
| *H01L 27/00* | (2006.01) |
| *G03F 1/00* | (2012.01) |
| *G03F 7/00* | (2006.01) |
| *G03F 1/70* | (2012.01) |
| *G03F 7/20* | (2006.01) |
| *H01L 27/02* | (2006.01) |

(52) U.S. Cl.
CPC ...... *G06F 17/5081* (2013.01); *G06F 17/5077* (2013.01); *G03F 1/70* (2013.01); *G03F 7/70425* (2013.01); *G06F 17/5068* (2013.01); *G06F 2217/12* (2013.01); *H01L 27/0207* (2013.01)

(58) Field of Classification Search
None
See application file for complete search history.

(56) References Cited

U.S. PATENT DOCUMENTS

| | | | |
|---|---|---|---|
| 5,598,343 A | 1/1997 | Roy | |
| 5,793,643 A | 8/1998 | Cal | |
| 6,230,304 B1 | 5/2001 | Groeneveld | |
| 6,664,638 B2 | 12/2003 | Ushlyama | |
| 7,191,425 B1* | 3/2007 | Malik | G06F 17/5068 706/13 |
| 7,308,669 B2* | 12/2007 | Buehler | G06F 17/5077 716/112 |

(Continued)

OTHER PUBLICATIONS

Non-Final Office Action dated Aug. 11, 2016 for U.S. Appl. No. 14/292,067.

(Continued)

*Primary Examiner* — Leigh Garbowski
(74) *Attorney, Agent, or Firm* — Vista IP Law Group, LLP

(57) ABSTRACT

Disclosed are techniques for implementing DRC clean multi-patterning process nodes with lateral fills. These techniques identify design rules governing multi-patterning and track patterns by accessing a rule deck to retrieve the design rules, identify a first shape and a second shape sandwiching a space and characteristics of the first and second shapes by examining design data of the electronic design, insert one or more lateral fill shapes in the space by implementing the one or more lateral fill shapes along one or more routing tracks of a legal track pattern while automatically complying with the design rules, and perform post-lateral fill or post-layout operations to improve the layout and to prepare the layout for manufacturing.

20 Claims, 17 Drawing Sheets

(56) References Cited

U.S. PATENT DOCUMENTS

| | | | |
|---|---|---|---|
| 7,378,195 B2* | 5/2008 | Graur | G03F 1/30 430/5 |
| 8,219,939 B2* | 7/2012 | Schultz | G06F 17/5081 716/50 |
| 8,225,239 B2 | 7/2012 | Reed et al. | |
| 8,316,326 B1 | 11/2012 | Pierrat | |
| 8,418,111 B2* | 4/2013 | Chen | G06F 17/5077 716/119 |
| 8,448,102 B2* | 5/2013 | Kornachuk | G06F 17/5068 716/118 |
| 8,494,760 B2 | 7/2013 | Yoel | |
| 8,510,702 B2 | 8/2013 | Bosshart | |
| 8,607,183 B2* | 12/2013 | Melzner | G06F 17/5072 716/126 |
| 8,701,056 B1* | 4/2014 | Friedberg | G06F 17/5081 716/55 |
| 8,707,223 B2 | 4/2014 | Blatchford | |
| 8,739,095 B2 | 5/2014 | Cao et al. | |
| 8,782,570 B1 | 7/2014 | Li | |
| 8,799,835 B2 | 8/2014 | Bendicksen et al. | |
| 8,843,867 B2* | 9/2014 | Chase | G06F 17/5081 716/111 |
| 8,871,104 B2 | 10/2014 | Park | |
| 8,898,614 B2* | 11/2014 | Sharma | G06F 17/5072 716/119 |
| 8,918,745 B2* | 12/2014 | Wang | G06F 17/5068 716/50 |
| 8,949,760 B2 | 2/2015 | Birch et al. | |
| 8,954,913 B1* | 2/2015 | Yuan | G06F 17/5068 716/126 |
| 8,959,466 B1 | 2/2015 | Hsu et al. | |
| 8,984,465 B1 | 3/2015 | Salowe | |
| 9,003,349 B1 | 4/2015 | Salowe | |
| 9,117,052 B1 | 8/2015 | Salowe et al. | |
| 9,141,751 B2 | 9/2015 | Lee | |
| 9,158,883 B2* | 10/2015 | Peng | G06F 17/5081 |
| 9,158,885 B1 | 10/2015 | Gray | |
| 9,245,082 B2 | 1/2016 | Birch | |
| 9,251,299 B1 | 2/2016 | Salowe | |
| 9,335,624 B2* | 5/2016 | Lee | G03F 1/00 |
| 9,372,952 B1 | 6/2016 | Sun | |
| 9,372,955 B1 | 6/2016 | Lee et al. | |
| 9,396,301 B1* | 7/2016 | Lee | G06F 17/5077 |
| 9,652,579 B1* | 5/2017 | Arkhipov | G06F 17/5081 |
| 9,659,138 B1* | 5/2017 | Powell | G06F 17/5081 |
| 2002/0069396 A1 | 6/2002 | Bhattacharya | |
| 2003/0005399 A1 | 1/2003 | Igarashi | |
| 2008/0028352 A1 | 1/2008 | Birch et al. | |
| 2011/0014786 A1 | 1/2011 | Sezginer | |
| 2014/0040847 A1* | 2/2014 | Milinichik | G06F 17/5081 716/119 |
| 2014/0145342 A1 | 5/2014 | Schultz et al. | |
| 2015/0234974 A1 | 8/2015 | Dechene | |

OTHER PUBLICATIONS

Notice of Allowance dated Feb. 8, 2015 for U.S. Appl. No. 14/292,122.
Final Office Action dated Oct. 28, 2015 for U.S. Appl. No. 14/292,166.
Non-Final Office Action dated May 28, 2015 for U.S. Appl. No. 14/292,166.
Notice of Allowance dated Mar. 15, 2016 for U.S. Appl. No. 14/292,166.
Non-Final Office Action dated Mar. 21, 2016 for U.S. Appl. No. 14/318,488.
Notice of Allowance dated Sep. 21, 2016 for U.S. Appl. No. 14/318,488.
Final Office Action dated Oct. 27, 2016 for U.S. Appl. No. 14/231,688.
Non-Final Office Action dated Mar. 29, 2016 for U.S. Appl. No. 14/231,688.
Non-Final Office Action dated Jul. 28, 2016 for U.S. Appl. No. 14/675,426.
Notice of Allowance dated Jan. 11, 2017 for U.S. Appl. No. 14/675,426.
Ex-parte Quayle Action dated Jan. 27, 2017 for U.S. Appl. No. 14/675,609.
Non-Final Office Action dated Mar. 9, 2017 for U.S. Appl. No. 14/231,688.
Final Office Action dated Mar. 24, 2017 for U.S. Appl. No. 14/292,067.
Supplemental Notice of Allowance dated Apr. 21, 2017 for U.S. Appl. No. 14/675,426.
Final Office Action dated Jun. 30, 2017 for U.S. Appl. No. 14/231,688.
Non-Final Office Action dated Aug. 11, 2017 for U.S. Appl. No. 14/292,067.
Non-Final Office Action dated Nov. 16, 2017 for U.S. Appl. No. 14/231,688.

* cited by examiner

METHODS, SYSTEMS, AND COMPUTER PROGRAM PRODUCT FOR IMPLEMENTING DRC CLEAN MULTI-PATTERNING PROCESS NODES WITH LATERAL FILLS IN ELECTRONIC DESIGNS

CROSS REFERENCE TO RELATED APPLICATIONS

This application is related to U.S. patent application Ser. No. 14/292,067 entitled "METHOD, SYSTEM, AND COMPUTER PROGRAM PRODUCT FOR IMPLEMENTING TRACK PATTERNS FOR ELECTRONIC CIRCUIT DESIGNS" and filed on May 30, 2014, U.S. patent application Ser. No. 14/292,122 entitled "METHOD, SYSTEM, AND COMPUTER PROGRAM PRODUCT FOR IMPLEMENTING REPETITIVE TRACK PATTERNS FOR ELECTRONIC CIRCUIT DESIGNS" and filed on May 30, 2014, U.S. patent application Ser. No. 14/292,166 entitled "METHOD, SYSTEM, AND COMPUTER PROGRAM PRODUCT FOR INTERCONNECTING CIRCUIT COMPONENTS WITH TRACK PATTERNS FOR ELECTRONIC CIRCUIT DESIGNS" and filed on May 30, 2014, U.S. patent application Ser. No. 14/318,488 entitled "METHOD, SYSTEM, AND COMPUTER PROGRAM PRODUCT FOR CHECKING OR VERIFYING SHAPES IN TRACK PATTERNS FOR ELECTRONIC CIRCUIT DESIGNS" and filed on Jun. 27, 2014, U.S. patent application Ser. No. 14/675,426, entitled "METHODS, SYSTEMS, AND COMPUTER PROGRAM PRODUCT FOR IMPLEMENTING DRC CLEAN MULTI-PATTERNING PROCESS NODES WITH PARALLEL FILLS IN ELECTRONIC DESIGNS" and filed concurrently and U.S. patent application Ser. No. 14/675,609, entitled "METHODS, SYSTEMS, AND COMPUTER PROGRAM PRODUCT FOR A BOTTOM-UP ELECTRONIC DESIGN IMPLEMENTATION FLOW AND TRACK PATTERN DEFINITION FOR MULTIPLE-PATTERNING LITHOGRAPHIC TECHNIQUES" and filed concurrently. The contents of the aforementioned U.S. patent applications are hereby expressly incorporated by reference in their entirety for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Foundries often require electronic design implementations to be limited to a constrained number of routing track arrangements, each of which may only take on interconnect segments having width values from a discrete set of legal widths that may be made available in the process Design Rule Manual (DRM) in an effort accommodate complex design rules for advanced process nodes (e.g., 14-nm, 10-nm or below). Furthermore, in order to facilitate multiple-patterning lithographic processes (e.g., SADP or self-aligned double-patterning, SATP or self-aligned triple patterning, LELELE or lithography-etch-lithography-etch-lithography-etch, etc.), foundries may further impose additional constraints on the availability of wire widths that are associated with routing tracks. For example, after a first routing track is chosen and assigned a mask color (e.g. B for Blue) for a particular interconnect segment having a specific width, the next routing track may need to be assigned a different color (e.g., C for Cyan), and may only accept a wire having one of a discrete set of legal width values, where the discrete set of legal width values is in turn a function of the legal width associated with the preceding B routing track.

An electronic design may thus correspond to and include about, for example, a dozen different wire widths, and the routing tracks for routing the electronic design may thus be associated with as many legal widths. Any attempt to manually figure out which routing track associated with a permissible width can be placed immediately adjacent to another routing track associated with another permissible width is nearly impossible due to the sheer number of different possible legal combinations of routing tracks, especially in light of the extremely complex design rules that govern what track patterns are deemed legal. Therefore, generating a legal track pattern including a plurality of tracks associated with some legal widths is nearly impossible to be performed manually, especially when an electronic design includes more than just a handful of legal or permissible widths. Repetitive track patterns may further exacerbate the complexity in that each track pattern needs to comply with governing design rules and constraints for track patterns, and the repetitive track patterns as a whole also needs to comply with the same set of governing design rules and constraints. Any additions or removal of one or more tracks to a track pattern may propagate throughout the repetitive track patterns, even if a single track pattern may comply with all the pertinent design rules and constraints.

The interplay among complex design rules, the permissible, legal track patterns, and the addition, removal, or modification of an existing design component further complicates the solution finding process to an inextricable extent. A track pattern may be deemed legal if the group of one or more routing tracks in the track pattern complies with various design rules governing which arrangements or sequences of routing track associated with their respective widths are permitted. For example, a design may prohibit arranging a thin wire segment having a width of w1 immediately adjacent to a thick or fat wire segment having a width of w2 in any track pattern. Given this design rule, any track patterns having such an arrangement of two immediately neighboring tracks associated with w1 with w2 violate this design rule and will thus be considered illegal. During the physical design implementation stage, a change may be introduced into an electronic design by, for example, adding, removing, or modifying one or more shapes (e.g., wire segments) in a region of an electronic design. Such a change may be introduced manually by a designer during an interactive editing session or by an electronic design automation (EDA) tool. For example, a designer may insert a second metal shape on a second routing track in a region of an electronic design. The insertion of the second metal shape may leave a space between the second metal shape and a preexisting first metal shape implemented along a first routing track.

Assuming the distance between the first metal shape and the second metal shape is the fill distance, the goal is then to find positive definite solutions to a linear Diophantine equation. Depending upon the number of permissible wire widths in an electronic design, the linear Diophantine equation may be solved by using combinatorial optimization techniques such as those used to solve the Knapsack problem in some embodiments. Some other embodiments may utilize a static, predetermined dictionary including permissible legal track patterns that may be looked up for the region at issue. A set of legal track patterns may be identified by considering, for example, the widths of the first shape and the second shape and the fill distance.

Therefore, there exists a need for a method, system, and computer program product for implementing DRC (design rule check) clean multi-patterning process nodes with lateral fills in electronic designs.

SUMMARY

Disclosed are method(s), system(s), and article(s) of manufacture for implementing DRC (design rule check) clean multi-patterning process nodes with lateral fills in an electronic design in various embodiments. Some first embodiments are directed at a method for implementing DRC (design rule check) clean multi-patterning process nodes with lateral fills in an electronic design.

In these first embodiments, the method may include the act of identifying, at a rule mechanism coupled at least one micro-processor of a computing system, one or more design rules that govern multiple patterning and track patterns by accessing a rule deck to retrieve the one or more design rules and the act of identifying, at a layout editing mechanism coupled with an input/output (10) mechanism of the computing system, a first shape and a second shape by using the layout editing mechanism to examine design data of a portion of the electronic design to determine the first and the second shapes that sandwich a space and one or more characteristics of the first and the second shapes.

The method may further include the act of inserting, at a lateral fill mechanism coupled to the layout editing mechanism and the rule mechanism, one or more lateral fill shapes for the space by using the lateral fill mechanism to implement the one or more lateral fill shapes {along one or more corresponding routing tracks} in the space sandwiched by the two or more shapes while automatically complying with the one or more design rules and the act of performing, at a post-lateral fill mechanism or a post-layout mechanism, one or more layout operations on the layout including the one or more lateral fill shapes to improve the layout and to prepare the layout for manufacturing.

In some of these first embodiments, the method may further identify, at a track pattern processing mechanism coupled with the layout editing mechanism, a first set of one or more tracks corresponding to the first shape and a second set of one or more tracks corresponding to the second shape, identify, at the track pattern processing mechanism, one or more first width values of the first set of one or more tracks and one or more second width values of the second set of one or more tracks, and identify, at the track pattern processing mechanism, one or more first photomask designations of the first set of one or more tracks and one or more second photomask designations of the second set of one or more tracks.

In one or more of the immediately preceding embodiments, the method may further identify, at the track pattern processing mechanism coupled with the layout editing mechanism, a fill distance for the region by using the layout editing mechanism to identify two opposing edges of the first shape and the second shape and determine the fill distance between the two opposing edges and determine, at a track pattern evaluation mechanism, whether lateral fill is to be performed by using the track pattern evaluation mechanism to examine the fill distance against one or more criteria to determine whether the fill distance triggers the lateral fill.

In some of these first embodiments, the method may further comprise the act of determining, at a track pattern evaluation mechanism or a track pattern generation mechanism, one or more legal track pattern candidates for the space based in part or in whole upon the one or more characteristics, wherein the one or more characteristics comprise a first width of the first shape and a second width of the second shape and the act of determining, at the track pattern evaluation mechanism or the track pattern generation mechanism, a legal track pattern by using the track pattern evaluation mechanism or the track pattern generation mechanism to examine the one or more legal track pattern candidates against one or more criteria.

In some of the immediately preceding embodiments, the method may further pre-color, at a track pattern processing mechanism coupled with the rule mechanism, one or more tracks in the legal track pattern by using the track pattern processing mechanism to reference the one or more design rules and assign one or more photomask designations to the one or more tracks based in part upon a first photomask designation of the first shape or a second photomask designation of the second shape. In addition or in the alternative, the method may further identify, at the track pattern processing mechanism or the track pattern generation mechanism, one or more tracks in the legal track pattern that correspond to the one or more lateral fill shapes and determining, at the track pattern processing mechanism, the track pattern generation mechanism, or the layout editing mechanism, one or more widths for the one or more lateral fill shapes or associated with the one or more tracks corresponding to the one or more lateral fill shapes.

In some of the immediately embodiments, the method may further determine, at the lateral fill mechanism associated with the track pattern processing mechanism or the track pattern generation mechanism, one or more photomask designations for the one or more lateral fill shapes by referencing a first photomask designation of the first shape or a second photomask designation of the second shape to determine the one or more photomask designations based in part upon the one or more design rules. In addition or in the alternative, the method may further identify, at the lateral fill mechanism coupled with the layout editing mechanism, one or more shape ends of the one or more lateral fill shapes by examining the design data of the one or more lateral fill shapes and modify, at the lateral fill mechanism, at least one shape end of the one or more shape ends of the one or more lateral fill shapes by examining the one or more design rules against the at least one shape end and extending or trimming the at least one shape end based in part upon examination results.

In some of the first embodiments, the method may also identify, at a design traversal mechanism coupled with the lateral fill mechanism, a lateral fill shape in the region of the layout by inquiring into an electronic design database to retrieve the lateral fill shape and identify, at a slice mechanism coupled with the lateral fill mechanism, a sliced line segment for the lateral fill shape by projecting shape ends of the lateral fill shape to form projected shape ends or by projecting the lateral fill shape onto a reference line. In some of these embodiments, the method may further identify, at the slice mechanism, one or more slices in which the lateral fill shape is located by comparing slice lines of the one or more slices to the shape ends of the lateral fill shape and identify, at the slice mechanism, one or more existing sliced line segments in the one or more slices by examining dictionary entries in a shape dictionary.

In addition or in the alternative, the method may partition, at the slice mechanism, at least one existing sliced line segments of the one or more existing sliced line segments into multiple sliced line sub-segments by subdividing the at least one existing sliced line segments with at least one projected shape end of the projected shape ends, update, at the slice mechanism, the shape dictionary by revising at least one dictionary entry of the dictionary entries with data corresponding to the multiple sliced line sub-segments, and associate, at the slice mechanism, the at least one dictionary entry with the lateral fill shape dictionary. In some of the first embodiments, the one or more design rules includes an implied design rule that is not explicitly specified in the rule deck.

Some embodiments are directed at one or more hardware mechanisms that include and/or function in conjunction with at least one micro-processor as well as other related components or architectures of one or more computing systems and may be invoked to perform any of the methods, processes, or sub-processes disclosed herein. The hardware system may include one or more variants of a track pattern processing mechanism, a track pattern database enumeration mechanism, an implementation option processing mechanism, a track pattern generation mechanism, a lateral fill mechanism, a track pattern evaluation mechanism, a slice mechanism, and/or a post-lateral fill or post-layout operation mechanism in some embodiments.

Each of these mechanisms may include or function in tandem with electrical circuitry and one or more microprocessors each having one or more processor cores to perform their intended functions. The hardware system may further include one or more forms of non-transitory machine-readable storage media or persistent storage devices to temporarily or persistently store various types of data or information, various design rules, various libraries, selected and selectable targets, or any other suitable information or data, etc. Some illustrative modules or components of the hardware system may be found in the System Architecture Overview section below.

Some embodiments are directed at an article of manufacture that includes a non-transitory machine-accessible storage medium having stored thereupon a sequence of instructions which, when executed by at least one micro-processor or at least one processor core, causes the at least one micro-processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for implementing three-dimensional operations for electronic designs are described below with reference to FIGS. 1-6.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 4A-1 illustrates a simplified scenario where two wire segments are spaced at a distance that is different from and thus violates the constant spacing rule in some embodiments.

FIG. 4A-2 illustrates a simplified scenario where two wire segments are spaced at a distance that is different from and thus violates the constant spacing rule in some embodiments.

DETAILED DESCRIPTION

Figure 1:
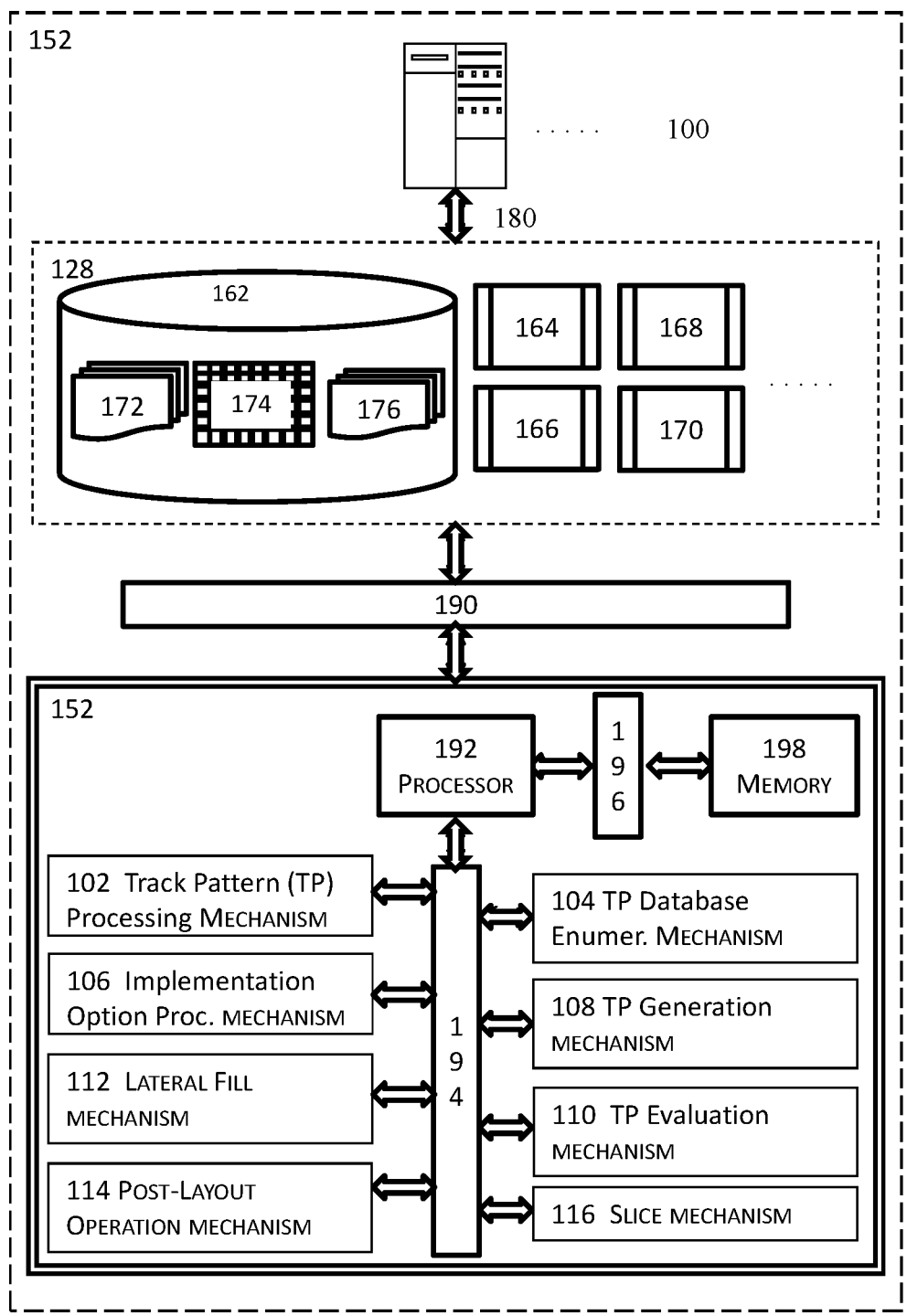
FIG. 1 illustrates a high level block diagram of an electronic design automation system for implementing DRC (design rule check) clean multi-patterning process nodes with lateral fills in electronic designs in one or more embodiments.

Various embodiments are directed to a method, system, and computer program product for implementing electronic design layouts with symbolic representations. Other objects, features, and advantages of the invention are described in the detailed description, figures, and claims.

One or more embodiments of the first invention are directed at using fill shapes to implement a layout that automatically complies with various design rules or constraints. More specifically, the layout implemented with various techniques described herein automatically satisfy various design rules or constraints including, for example, design rules or constraints for track patterns and multiple-patterning electronic designs. In these embodiments, the techniques described herein first identify an empty region that is sandwiched by existing shapes (e.g., wire segments, vias, etc.) in a layout.

One or more legal track pattern candidates for the region may be determined or identified from a set of permissible, legal candidate track patterns. If there is more than one legal track pattern candidate, a final track pattern may be determined from the one or more legal track pattern candidates based upon, for example, evaluation results of the one or more legal track pattern candidates against a cost function. Fill shapes may thus be inserted along at least one routing track according to the final track pattern based at least in part upon the controlling design rules and/or constraints.

In some embodiments where various design rules or constraints are already incorporated into the insertion of fill shapes, the fill shapes automatically satisfy these design rules or constraints as inserted. In some other embodiments where one or more design rules or constraints may not necessarily be automatically incorporated into the fill shape insertion process, the techniques described herein may proceed through optional processing to modify the inserted fill shapes to further accommodate these design rules. For example, a constraint of having a more structured layout where shape ends are aligned to the extent permitted by design rules may be desired or preferred in the layout. Such a constraint may be presented as an optional constraint and thus may not necessarily be incorporated during the fill shape insertion or implementation in some embodiments.

In these embodiments, the length of a fill shape may be extended or trimmed individually or in consideration of one or more other shapes along other tracks while its width remains as what the routing track along which the fill shape is inserted is associated with. For example, a fill shape along a routing tracks may be extended or trimmed so that one or both ends of the fill shape at issue are aligned with the corresponding ends of one or more other shapes on one or more neighboring routing tracks one either or both sides of the routing track.

As another example, a fill shape along a routing track may be extended or trimmed in view of one or more other shapes in one or more neighboring routing tracks so that one or both ends of the fill shape comply with the governing design rules (e.g., keep-out rules, minimum-length rule, etc.) In addition or in the alternative, two fill shapes along the same tracks may be merged into one single fill shape in some embodiments. A fill shape may also be merged with an existing shape to become one single shape in some embodiments.

In some embodiments where an existing shape may be interactively added or modified in a region, the techniques described herein may automatically react to the insertion or modification of the existing shape and insert one or more fill shapes according to the final track pattern and governing design rules or constraints in a nearly real-time manner so that at least the region automatically satisfies these design rules or constraints and is thus amenable to multiple-patterning lithographic processes.

In some of these embodiments, the techniques described herein are color-aware to automatically associate the fill shapes with their respective mask designations such that the layout need not go through conventional layout analysis or decomposition processes to determine which shapes are to be manufactured with which photolithography masks. In these embodiments, the shapes and the fill shapes may be inserted into a layout according to the mask designation or coloring associated with the routing tracks or with the legal track patterns.

It shall be noted that although the aforementioned embodiments refer to widths and lengths of shapes and may thus imply that these shapes have rectangular or square forms. Nonetheless, it shall be noted that the reference to lengths or widths of shapes in the aforementioned embodiments is for the ease of explanation and is not intended to limit the shapes in an electronic design to only rectangular or square forms. One of ordinary skill in the art will certainly appreciate and contemplate that the described techniques may also apply to other shapes or forms such as a shape having one or more bends. Therefore, the techniques described herein may be applied to both the SADP (self-aligned double patterning), SATP (self-aligned triple patterning), and LELELE (lithography-etch-lithography-etch-lithography-etch) processes.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-6.

FIG. 1 illustrates a illustrative high level schematic block diagrams for implementing DRC clean multi-patterning process nodes with lateral fills in electronic designs. In one or more embodiments, FIG. 1 illustrates an illustrative high level schematic block diagrams for implementing DRC clean multi-patterning process nodes with lateral fills in electronic designs and may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc. The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of mechanisms 152 including hardware mechanisms and software modules or combinations of one or more hardware mechanisms and one or more software modules that may comprises one or more track pattern processing modules 102 to insert, remove, modify, improve, optimize, or otherwise operate upon tracks or routing tracks in track patterns. The set of mechanisms 152 may further include a track pattern enumeration mechanism 104 to enumerate, determine, or update legal track pattern database(s) to generate viable implementing options for track associated with various widths.

The set of mechanisms 152 may further optionally include one or more implementing option processing mechanisms 106 to identify, determine, modify, or rank viable implementing options based on one or more criteria. In addition or in the alternative, the set of mechanisms 152 may further include a track pattern generation mechanism 108 to generate, update, modify, or otherwise perform various operations on track patterns and/or to forward predict subsequent additions of tracks into a track pattern. In some embodiments, the set of mechanisms 152 may further include a track pattern evaluation mechanism 110 to evaluate track patterns against various design rules, performance objectives, manufacturing requirements, and/or other constraints.

The set of mechanisms 152 may further include a lateral fill mechanism 112 to implement lateral fill structures or shapes in an electronic design while satisfying governing design rules and constraints. In addition or in the alternative, the set of mechanisms 152 may comprise a post-layout operation mechanism 114 to perform one or more post-layout operations including, for example, post-layout analyses, simulations, design rule check, tapeout, verification, etc.

In some embodiments, the computing system 100 may include the various resources 128 such that these various resources may be invoked from within the computing system via a computer bus 180 (e.g., a data bus interfacing a microprocessor 192 and the non-transitory computer accessible storage 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

The computing system may also include one or more mechanisms in the set of mechanisms 152. One or more mechanisms in the set 152 may include or at least function in tandem with a microprocessor 152 via a computer bus 194 in some embodiments. In these embodiments, a single microprocessor 192 may be included in and thus shared among more than one mechanism even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 2:
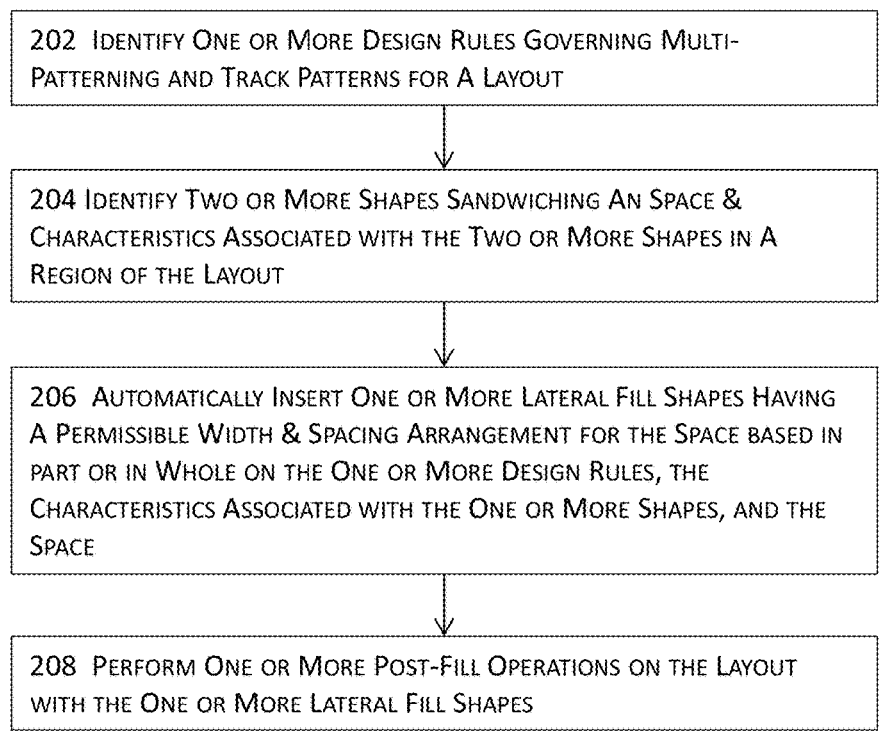
FIG. 2 illustrates a high-level block diagram for implementing DRC clean multi-patterning process nodes with lateral fills in electronic designs in one or more embodiments.
Figure 3A:
FIGS. 3A-D jointly illustrate a more detailed block diagram for implementing DRC clean multi-patterning process nodes with lateral fills in electronic designs in one or more embodiments.
Figure 3B:
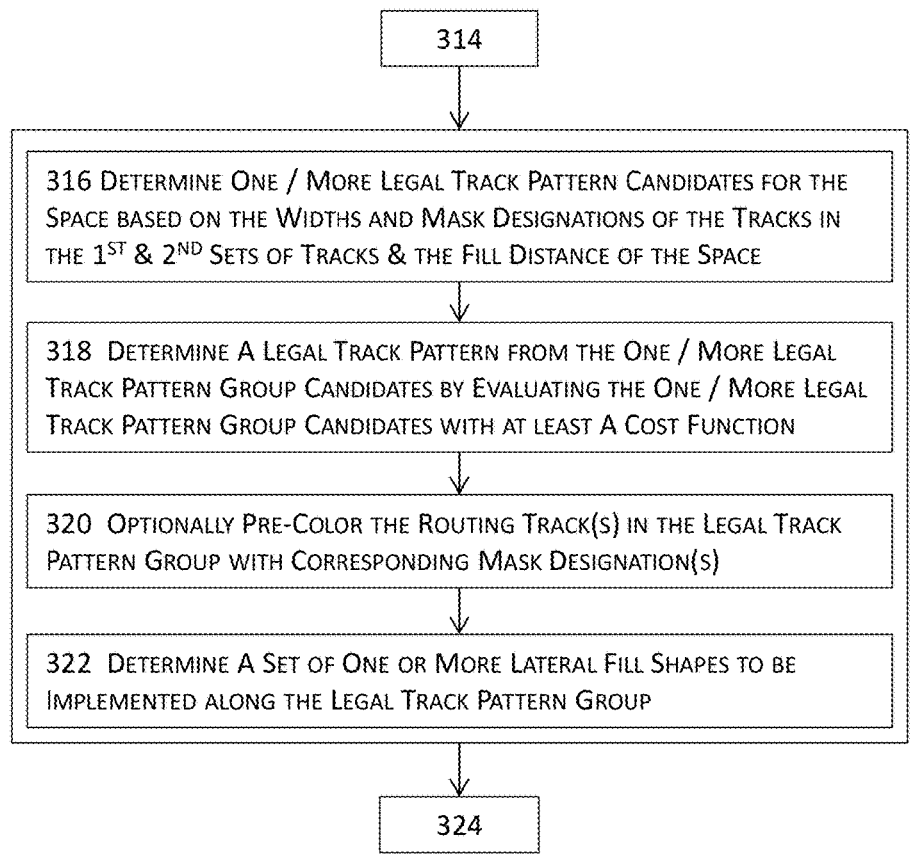
Figure 3C:
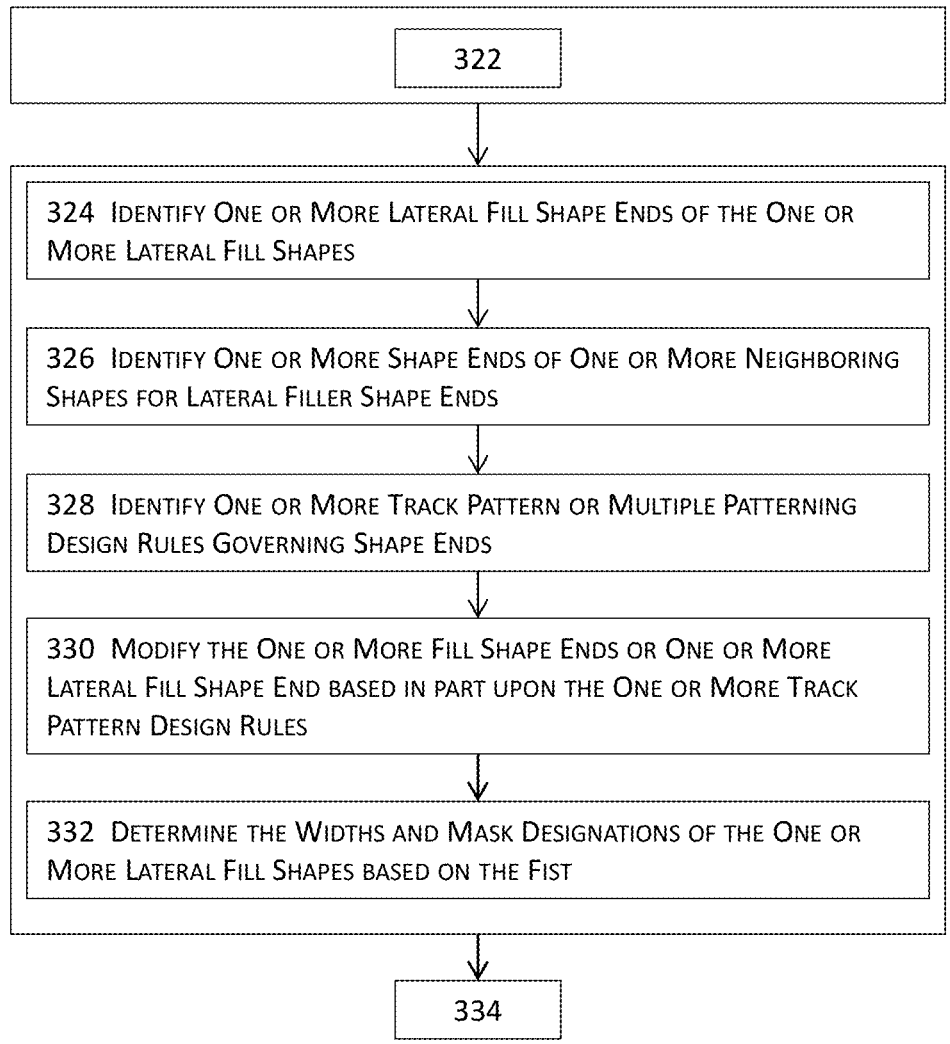
Figure 3D:
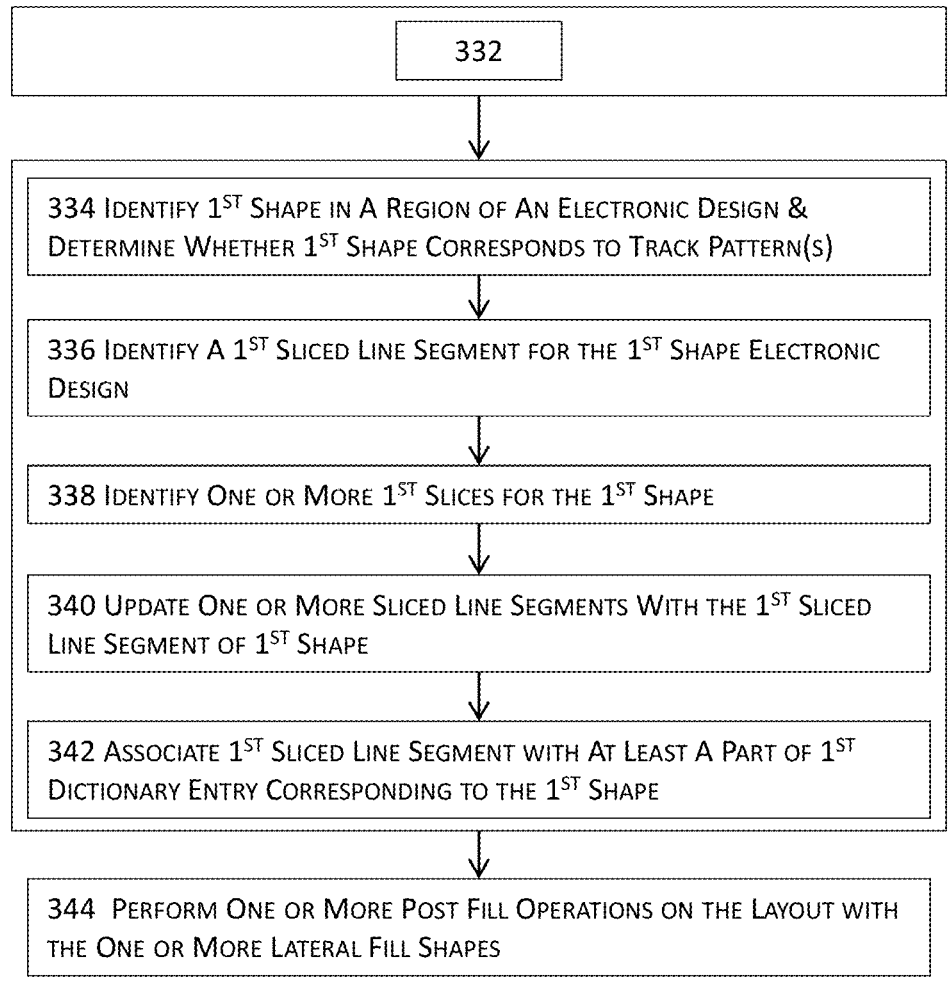

FIG. 2 illustrates a high-level block diagram for implementing DRC (design rule check) clean multi-patterning process nodes with lateral fills in electronic designs in one or more embodiments. In one or more embodiments, one or more design rules governing multiple patterning and track patterns may be identified for a layout at 202. For example, a design rule mechanism may identify the one or more rules from a rule deck and/or from a process design rule manual (DRM) at 202. In one embodiment, at least one shape of the two or more identified shapes includes an interactively added or modified shape by a designer during an interactive layout editing session.

These one or more design rules may also be implied due to one or more particular manufacturing processes that will be used to manufacture integrated circuits according to their respective electronic designs. For example, the use of a negative tone SADP process may imply a single or constant spacing design rule requiring a constant spacing distance between two immediately neighboring interconnects. Another design rule that may be implied by the N-SADP process includes a uni-directional routing design rule requiring that all routes be implemented in the right-way direction (e.g., the preferred routing direction), and that no wrong-way routing (e.g., routing in the non-preferred routing direction) is permitted on one or more layers of an electronic design.

Other implied design rules may further include a limited number of permissible arrangements of interconnect widths. Design rules governing multiple patterning lithographic processes may include, for example, explicitly specified or implied design rules comprising, for example, a constant spacing design rule, a minimum length design rule, one or more pair design rules (or BC design rules), one or more triplet design rules (or BCB design rules), the same color line end spacing design rule, a different color line end spacing design rule, a same track, same color, different width line end spacing design rule, a different track, different color line end spacing design rule, an end of line keep-out design rule, an opposing end of line keep-out design rule, a minimum end of line spacing design rule, etc. in some embodiments.

Design rules governing track patterns may allow only certain arrangements of widths of shapes and thus only these arrangements of width values that may be associated with a track pattern comprising a plurality of routing tracks. For example, a pair design rule may allow a 32 nm interconnect (and hence a routing track associated with the 32 nm width value) to be immediately adjacent to another interconnect having a width value of 32 nm, 34 nm, 38 nm, 46 nm, and 58 nm and prohibits a routing track associated with the 32 nm width value to be immediately adjacent to another routing track associated with 62 nm, 70 nm, 76 nm, or 86 nm width value. Examples and more details about some design rules and their operations on electronic designs are described below with reference to FIGS. 4A-I.

A track pattern is a collection of one or more tracks associated with their respective widths of the shapes (e.g., wire segments) that are to be implemented along these one or more tracks. A track pattern is considered legal if the collection of one or more tracks in the track pattern complies with various design rules governing which arrangements or sequences of track associated with their respective widths are permitted. For example, a design may prohibit arranging a thin wire segment having a width of $w_1$ immediately adjacent to a thick or fat wire segment having a width of $w_2$ in any track pattern. Given this design rule, any track patterns having such an arrangement of two immediately neighboring tracks associated with $w_1$ with $w_2$ violate this design rule and will thus be considered illegal.

A routing track or simply a track (hereinafter a "track") includes a one-dimensional fictitious line or line segment derived from the manufacturing grids provided by foundries. A routing track thus having zero width in physical designs (e.g., a layout of an electronic design) and is used to guide physical implementation tools (e.g., floorplanner, placement tools, or routing tools) to implement the physical design for an electronic design. For example, a routing tool may lay the centerline of a wire segment along a routing track during the routing process. A routing track may nonetheless be associated with a width to indicate that the particular routing track is to be used to route wires having the associated width. In this application, some routing tracks may be illustrated as rectangular shapes to indicate that such routing tracks are associated with the widths as shown in various figures. Nonetheless, the rectangular representations of such routing tracks are not intended to explicitly, implicitly, or inherently indicate that routing tracks have two-dimensional geometrical structures or shapes.

A slice corresponds to a region (e.g., a cell, a block, or an area) that spans along a routing direction and may extend across the entire length in the other routing direction. In the context including a sliced line (see below), a slice may include multiple segments (e.g., sliced line segments) along the sliced line. In this context, a segment or a slice along a sliced line may comprises an object that may be used to traverse a container including, for example, lists, maps, a sliced line, etc. In these embodiments, a sliced line comprises a collection of ordered objects (e.g., the aforementioned "segments" or "slices").

A segment may be formed along a sliced line when projecting the end points of a wire segment onto the sliced line. Such a segment between a start point and an end point, projected from a corresponding wire segment, along the sliced line may be called a sliced line segment. A sliced line segment may be obtained by projecting the line ends of a wire segment onto the slice line and thus may be associated with the absolute or relative coordinates of the start point indicating the beginning of the sliced line segment and the end point indicating the end point of the sliced line segment. A sliced line segment may be further divided into multiple, shorter sliced line segments. Multiple sliced line segments may also be merged into a longer, single sliced segment. The region situated between two segments and perpendicular to the routing direction may be called a slice where these two vertical line segments may extend all the way to the upper period line of the region. More details about these mechanisms will be described below with reference to FIGS. 2-5L.

Figure 5A:
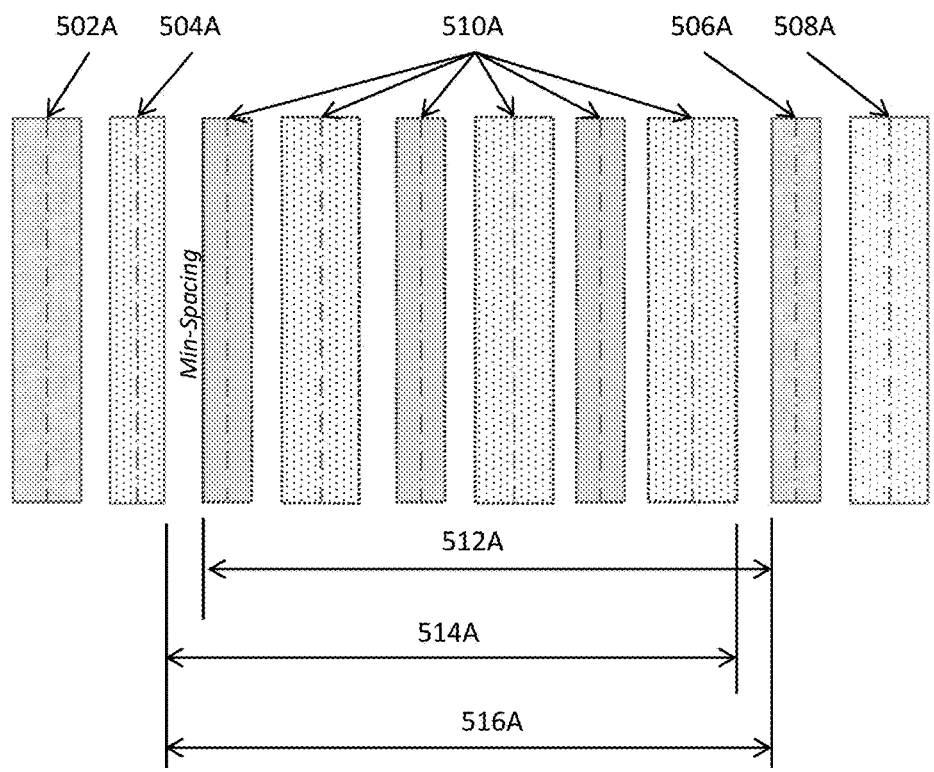
FIGS. 5A-M illustrate some examples for application of some techniques for implementing DRC clean multi-patterning process nodes with lateral fills in electronic designs in one or more embodiments.
Figure 5B:
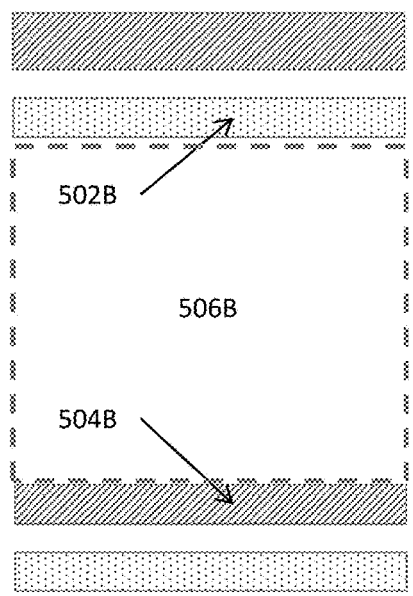

At 204, two or more shapes that sandwich a space as well as one or more characteristics associated with the one or more shapes may be identified for a region in a layout of an electronic design. These two or more shapes may belong to one or more track patterns, each of which is associated with a portion of the region. For example, shapes 502B and 504B in FIG. 5B sandwich a space 506B between these two shapes. It shall be noted that the space 506B in FIG. 5B are drawn for illustration purposes, and that its size and shape may not necessarily drawn to scale.

The space sandwiched by the two or more shapes may be occupied in some embodiments or unoccupied in some other embodiments. For example, the space sandwiched by the two outermost shapes of the two or more shapes may include one or more other shapes between the two outermost shapes in some embodiments. In these embodiments, various techniques account for not only the two outermost shapes sandwiching the space but also the one or more other shapes within the space in the implementation of one or more lateral fill shapes while satisfying the identified one or more design rules governing these two outermost shapes as well as the one or more other shapes.

One or more lateral fill shapes may be automatically inserted into the space at 206 based in part or in whole upon the one or more identified design rules, the one or more characteristics associated with the two or more shapes, and one or more space characteristics of the space. For example, a lateral fill mechanism (e.g., reference numeral 112 of FIG. 1) may automatically examine the size of the space as well as the widths and the spacing values of the two or more identified shapes.

Based on the size, the widths, and the spacing values, the lateral fill mechanism may alone or function in tandem with, for example, a design rule check (DRC) mechanism to determine whether one or more viable later fill solutions may be found in some embodiments. In some of these embodiments where it is determined that one or more viable lateral fill solutions may be found, one or more legal candidate track patterns for the space may further be determined (e.g., by performing a table look-up from a list, table, or database of legal track patterns). A final track pattern for the implementation of lateral fill shapes in the space may then be selected from the one or more legal candidate track patterns for implementation of lateral fill shapes.

The lateral fill mechanism may further examine the ends of the two or more identified shapes to determine the ends of the one or more lateral fill shapes so that the lateral fill shapes comply with the one or more identified design rules (e.g., minimum length design rule, end of line spacing design rule, opposing end of line spacing design rule, etc.) In these embodiments, the layout having the automatically inserted one or more lateral fill shapes is DRC clean at least to the extent that the one or more identified design rules are concerned. In some embodiment where at least one shape of the two or more identified shapes is interactively inserted or modified by a designer during an interactive layout editing session, the lateral fill mechanism may function with one or more other mechanisms to automatically insert one or more lateral fill shapes into a space while generating a DRC clean layout.

At 208, one or more post-lateral fill operations may be performed by, for example, the post-layout operation mechanism (e.g., reference numeral 114 of FIG. 1) with the automatically inserted one or more lateral fill shapes. These one or more post-lateral fill operations may include, for example, design rule checks, electrically aware design implementation, verification tasks, various analyses (e.g., reliability analyses, manufacturability analyses, performance analyses, electro-migration analyses, IR analyses, other electrical analyses, etc.), various simulations (e.g., SPICE simulations or variants thereof, lithographic simulations, etc.), lithography enhancements (e.g., optical proximity correction or OPC, computational lithography, etc.), resolution enhance techniques (RET), design closure, tape-out, etc. In some of these embodiments, various verification tasks or design rule checks may ignore the one or more design rules identified at 202 because the generated layout including the one or more lateral fill shapes automatically complies with these one or more design rules.

FIGS. 3A-D jointly illustrate a more detailed block diagram for implementing DRC (design rule check) clean multi-patterning process nodes with lateral fills in electronic designs in one or more embodiments. In these embodiments, a set of design rules governing track patterns and multiple patterning may be identified for a layout of an electronic design. As described with reference to FIG. 2, the set of design rules may include one or more explicitly specified design rules, one or more implied design rules, or any combinations thereof. Therefore, one or more implied design rules may be identified at 304 into the set of design rules identified at 302 in some of these embodiments.

At 306, a first shape and a second shape that sandwich a space between the first shape and the second shape may be identified in the layout. In some embodiments, the first shape may belong to the first track pattern for a first region in the layout, and the second shape may belong to the second track pattern for a second region in the layout. In these embodiments, the space constitutes a transition region between the first region and the second region. Various mechanisms and techniques described herein may then be invoked to determine one or more lateral fill shapes for this transition region so that at least these three regions comply with the identified design rules.

A first set of tracks corresponding to the first track and a second set of tracks corresponding to the second shape may be optionally identified at 308. A track does not have any thickness and is used as a reference to guide physical electronic design implementation tools (e.g., various routing engines or mechanisms). A track may nevertheless be associated with a thickness value so that a shape (e.g., an interconnect or a trace) implemented thereon has or inherits the associated width value.

Due to the identification of the first shape having a first width and the second shape having a second width, various mechanisms already have sufficient information to identify a legal track pattern for the space, although these various mechanism may perform one or more mappings or processes to translate the widths of these two shapes to identify one or more legal track patterns for the one or more lateral fill shapes in some embodiments. In some of these embodiments, the associated widths and/or the associated mask designations for the tracks in first set and the second set of track patterns may be identified at 310. The fill distance for the space may be identified at 312. For example, a layout editor may identify the closest distance between the opposing edges of the first shape and the second shape as the fil distance for the space sandwiched by the first shape and the second shape in some embodiments.

The fill distance for the space may be further examined to determine whether the fill distance triggers lateral fill at 314. For example, the lateral fill mechanism may determine whether the fill distance triggers lateral fill by comparing the fill distance with a predetermined value including one or more minimum distance values for which one or more lateral fill shapes may be added along the one or more corresponding routing tracks between the first shape and the second shape. If the fill distance is determined not to trigger lateral fill, the lateral fill mechanism and/or the design rule check mechanism may further determine whether the fill distance disallowing any lateral fill shapes in between is legal without any lateral fill shapes therein.

In some embodiments, various techniques described herein may efficiently determine whether or not the fill distance is legal or whether or not one or more viable lateral fill solutions may be found. In an example where both the permissible widths and the spacing values comprise only even values, an odd numbered fill distance can be quickly determined to be illegal because no viable lateral fill solutions may be found for the odd-numbered fill distance regardless of the number of tracks or arrangements of the tracks that are associated with even-numbered widths and are spaced apart from each other at some even-numbered spacing values. As another example where legal track patterns are provided in a data structure via track pattern enumeration, the fill distance of each legal track pattern may be quickly calculated by adding the associated widths and spacing values in the track pattern. In this example, a set of discrete fill distance values may be derived from the legal track patterns, and the legality of the fill distance identified at 312 may be quickly determined by looking up or querying the data structure including the set of discrete fill distance values.

If the fill distance is determined to be legal, these techniques and mechanisms may proceed to the next set of tasks for lateral fill implementation. If it is determined that the fill distance is not legal (e.g., a designer may have interactively added the second shape relative to the first shape and caused an illegal fill distance), these techniques or mechanisms may flag either the interactively introduced second shape, the space, the first shape, or any combination thereof with, for example, one or more DRC markers to indicate that a design rule violation has occurred and no viable solutions may be found to resolve the violation in some embodiments. In some of these embodiments, these techniques or mechanisms may provide one or more hints or suggestions for fixing the second shape (or the first shape, or both) in order to produce a DRC clean design for at least the first shape and the added second shape.

In some embodiments, the data structure including legal track patterns may include all the permissible arrangements of routing tracks up to a prescribed fill distance. In some of these embodiments where the fill distance identified at 312 exceeds the prescribed fill distance, the identified fill distance may be sub-divided into multiple, smaller fill distances by referencing the data structure such that each smaller fill distance is permitted by the data structure. In these embodiments, lateral fill may be individually performed for each of these multiple, smaller fill distances while accounting for the governing one or more design rules such that the overall lateral fills for the space corresponding to the original fill distance identified at 312 are legal.

At 316, one or more legal track pattern candidates may be determined for the space based in part or in whole upon the widths of the first shape and the second shape, the mask designations of the two tracks for the first shape and the second shape, and the fill distance of the space identified at 312. For example, a track pattern evaluation mechanism (e.g., reference numeral 110 of FIG. 1) and/or a track pattern generation mechanism (e.g., reference numeral 108 of FIG. 1). In some embodiments, these one or more legal track pattern candidates may be identified from a table, a data structure, or a database including legal track patterns and their respective various pieces of information (e.g., a bit-mask representing the a track pattern, an identification of a track pattern, information about the number of the tracks in a track pattern, the associated widths of a track pattern, the spacing value(s) between adjacent tracks in a track pattern, the span of a track pattern, etc.)

The track pattern evaluation mechanism or track pattern generation mechanism may perform a table look-up from the legal track pattern list or table or may query a legal track pattern database with the appropriate information (e.g., widths of the first shape and the second shape, the fill distance, the mask designations of the first shape and the second shape, etc.) to identify the one or more legal track pattern candidates at 316 in some embodiments. A legal track pattern may be identified from the one or more legal track pattern candidates at 318.

In some embodiments, the legal track pattern may be identified from the one or more legal track pattern candidates by evaluating the one or more legal track pattern candidates against a cost function or criterion at 318. For example, the track pattern evaluation mechanism or the track pattern generation mechanism may assign a higher priority (or a lower cost) to a track pattern candidate that provides more flexibility (e.g., more options for subsequent implementations of the layout, etc.), to a track pattern candidate whose tracks are associated with more larger width values (e.g., more tracks associated with wider widths due to the possibility of implementing a narrower shape on a track with a wider width value, but not vice versa), etc.

In some embodiments, the track pattern generation mechanism (e.g., reference numeral 108 of FIG. 1), the track pattern processing mechanism (e.g., reference numeral 102 of FIG. 1), the track pattern enumeration mechanism (e.g., reference numeral 104 of FIG. 1), or the track pattern evaluation mechanism (e.g., reference numeral 110 of FIG. 1) may identify the one or more legal track pattern candidates by solving the linear Diophantine equation with the fill distance as follows. The linear Diophantine equation may be formulated as a weakly NP-complete formula (or the exact Knapsack problem) as:

$$\text{FillDistance} = a_1 \times w_1 + a_2 \times w_2 + \ldots + a_n \times w_n \quad (1)$$

Where $\{a_1, a_2, \ldots, a_n\}$ denote non-negative integers corresponding to the i-th routing track, and $\{w_1, w_2, \ldots, w_n\}$ denote the sum of the width value associated with the i-th routing track and the minimum spacing value between the i-th routing track and its immediately preceding routing track. The track pattern generation mechanism may solve the linear Diophanine equation or the exact Knapsack problem in Eqn. (1) with a list of permissible widths (e.g., 32 nm, 34 nm, 38 nm, 46 nm, 58 nm, 62 nm, 70 nm, 76 nm, or 86 nm) to find one or more non-negative integer values $a_i$. More details about legal track patterns are described in the related U.S. patent applications listed in the Cross Reference to Related Applications section.

One or more routing tracks in the legal track pattern may be optionally pre-colored (e.g., pre-assigned one or more photomask designations) at 320. For example, the track pattern generation mechanism may pre-color the one or more routing tracks in the legal track pattern with the one or more corresponding photomask designations based in part or in whole on the photomask designations of the first shape and the second shape as well as the multiple patterning design rules that prohibit color conflict between two immediately neighboring shapes. In these embodiments where the routing tracks are pre-colored, the shapes implemented along these routing tracks automatically inherit the colors of their respective routing tracks. In other words, one or more lateral fill shapes that are subsequently implemented along the one or more corresponding routing tracks no longer need to be colored because these one or more lateral fill shapes automatically inherit the one or more colors of the one or more routing tracks.

At 322, one or more lateral fill shapes may be determined with the legal track pattern. For example, the lateral fill mechanism may implement a lateral fill shape along each routing track in the legal track pattern for the implementation of lateral fill shapes in the space. The lateral fill mechanism may further determine the locations of the ends of the one or more lateral fill shapes so that the one or more lateral fill shapes comply with the one or more identified design rules (e.g., minimum length design rule, end of line spacing design rule, opposing end of line spacing design rule, etc.) Depending upon whether or not the routing tracks in the legal track pattern are pre-colored, the lateral fill mechanism may either alone or in tandem with a track pattern generation mechanism or a DRC mechanism to determine the one or more photomask designations for the one or more lateral fill shapes. In these embodiments, the layout having the automatically inserted one or more lateral fill shapes is DRC clean at least to the extent that the one or more identified design rules are concerned.

In some of these embodiments, one or more lateral fill shape ends of the one or more lateral fill shapes may be identified at 324. One or more neighboring shape ends of one or more neighboring shapes of the first shape, the second shape, or both may be identified at 326. In some embodiments, the one or more neighboring shapes within a first range or a first halo of the first shape, a second range or a second halo of the second shape, or both are identified at 326. In some other embodiments, the one or more neighboring shapes are identified based in part or in whole upon one or more radii or one or more ranges of influence of one or more design rules. In some of these embodiments, the one or more neighboring shapes are identified based in part or in whole upon the largest range or radius of influence of a design rule. For example, if a first design rule only affects a shape on the first track and other shapes on the immediately neighboring tracks, and a second design rule affects a shape on the first track and other shapes on two neighboring tracks on either side of the first track (and hence has a larger range of influence), the one or more neighboring shapes may be identified by referencing the range or radii of influence of the second design rule in some embodiments.

One or more track pattern or multiple patterning design rules governing where an end of a shape may be located to produce a legal result may be identified at 328 with, for example, a design rule mechanism. The lateral fill mechanism may determine, at 330, the locations of the ends of the one or more lateral shape ends by referencing the one or more track pattern or multiple patterning design rules governing where an end of a shape may be located to produce a legal result. At 332, one or more candidate sets of lateral fill shapes may be determined based in part or in whole upon the first shape, the second shape, and their respective photomask designations.

The first shape in a region of the electronic design may be identified at 334, and it may be determined whether or not the identified first shape corresponds to one or more legal track patterns at 334. For example, the track pattern evaluation mechanism may function in tandem with a design traversal mechanism to identify the first shape and determine whether the first shape belongs to one or more existing, legal track patterns at 332. At 336, a first sliced line segment for the first shape. For example, the slice mechanism may project the ends of the first shape onto a reference line parallel to the routing direction of the layer on which the first shape is located to form the sliced line segment connecting the projected ends of the first shape on the reference line.

One or more slices in which the first shape is located may be identified at 338. The first shape may be located entirely within a slice in some embodiments and may span across more than one slice in some other embodiments. The slice mechanism may either alone or in tandem with one or more other mechanisms (e.g., a design traversal mechanism) to identify the one or more first slices in which the first shape exists at 338 by, for example, examining the slice lines and the projected ends of the first shape in some embodiments. At 340, one or more existing sliced line segments or their corresponding dictionary entries in a shape dictionary may be updated with the first sliced line segment of the first shape. At 342, the first sliced line segment, the projected ends, and/or the dada associated therewith may be associated with the first shape for subsequent use or reuse in, for example, one or more post-lateral fill and/or post layout operations. The slice mechanism may similar process the one or more lateral fill shapes either in a batch mode or dynamically as at least one lateral fill shape of the one or more lateral fill shapes is being generated or shortly after the at least one lateral fill shape of the one or more lateral fill shapes is generated by the lateral fill mechanism.

The generation of a sliced line segment on a reference line from a shape effectively converts and reduces the original dimensionality of the design data of the two-dimensional shape to one-dimensional design data represented by the sliced line segment, while the one-dimensional design data may still be used in, for example, design rule checks or verification tasks for at least the region without referring to the design data of the two-dimensional shapes to determine whether the one-dimensional data comply with various design rules governing the shape in one dimension or in both dimensions. In some of these embodiments, a sliced line represents a one-dimensional representation of various shapes in a two-dimensional design. More details about slices, slice lines, and sliced line segments are described in the related U.S. patent applications (e.g., U.S. patent application Ser. No. 14/318,488) listed in the Cross Reference to Related Applications section.

At 344, one or more post-lateral fill operations may be performed by, for example, the post-layout operation mechanism (e.g., reference numeral 114 of FIG. 1) with the automatically inserted one or more lateral fill shapes. These one or more post-lateral fill operations may include, for example, design rule checks, verification tasks, various analyses, various layout simulations, tapeout, etc. In some of these embodiments, various verification tasks or design rule checks may ignore the one or more design rules identified at 202 because the generated layout including the one or more lateral fill shapes automatically complies with these one or more design rules.

Figure 4A:
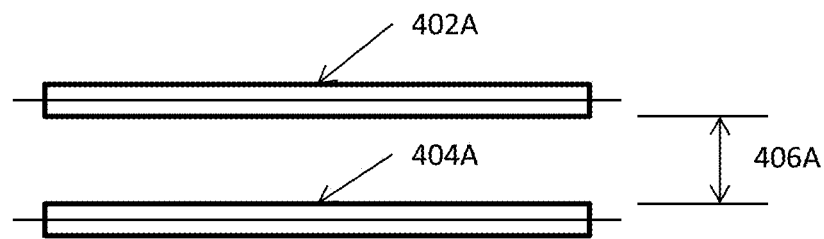
FIG. 4A illustrates a constant spacing design rule that requires two wire segments be spaced apart from each other at a constant spacing between corresponding edges of the wire segments.
Figures 1, 4A:
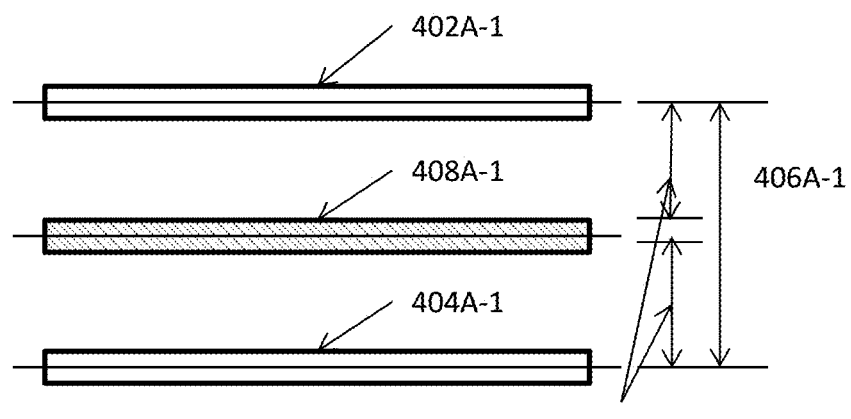
Figures 2, 4A:
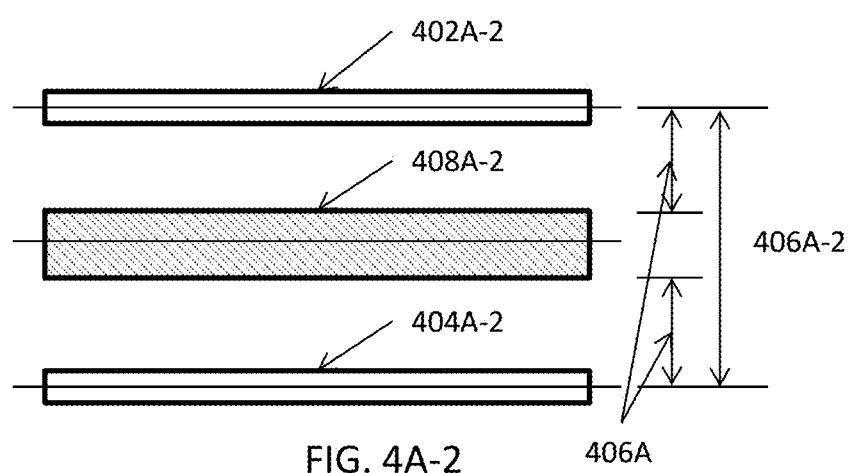

FIGS. 4A-I illustrates some illustrative design rules governing track patterns in electronic circuit designs in some embodiments. More specifically, FIG. 4A illustrates a constant spacing design rule that requires two wire segments 402A and 404A be spaced apart from each other at a constant spacing between corresponding edges of the wire segments as shown by the distance 406A in FIG. 4A. FIG. 4A-1 illustrates a scenario where two wire segments 402A-1 and 404A-1 are spaced at a distance 406A-1 that is different from and thus violates the constant spacing rule in some embodiments.

Various methods or systems may use techniques described herein to identify and insert another track 408A-1 between the first track for wire segment 402A-1 and the second track for wire segment 404A-1 to satisfy the constant spacing design rule. FIG. 4A-2 illustrates a scenario where two wire segments 402A-2 and 404A-2 are spaced at a distance 406A-2 that is different from and thus violates the constant spacing rule in some embodiments. Various methods or systems may use techniques described herein to identify and insert another track 408A-2 between the first track for wire segment 402A-2 and the second track for wire segment 404A-2 to satisfy the constant spacing design rule.

Figure 4B:
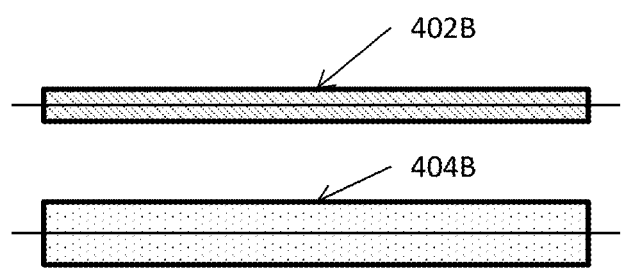
FIGS. 4B-I illustrates some illustrative design rules governing track patterns in electronic circuit designs in some embodiments.

FIG. 4B illustrates a pair design rule which requires two adjacent wire segments 402B and 404B spaced at a certain distance be placed on two separate photo masks for manufacturing. Each wire segment is then associated with its respective photomask designation. This design rule may further govern what width combinations are legal. In other words, given a set of width values that may be used to implement wires in an electronic design, only a smaller subset of width combinations out of the set of all possible width combinations are considered legal.

Figure 4C:
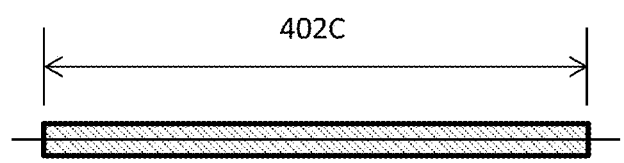
Figure 4D:
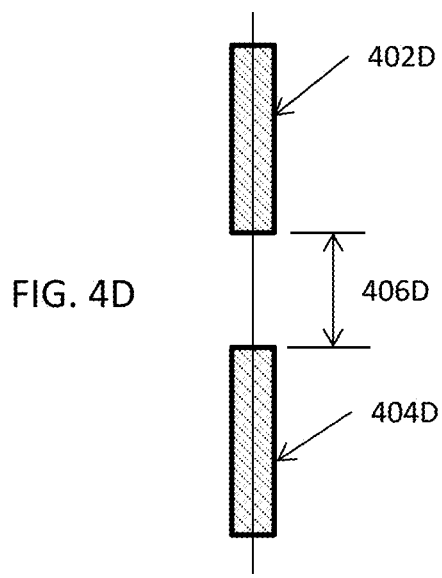

FIG. 4C illustrates a minimum length design rule that requires each wire segment in an electronic design to have at least the minimum required length 402C in order to comply with this minimum length design rule. FIG. 4D illustrates the same track, same color line end spacing design rule which requires that the two facing line ends of two wire segments 402D and 404D along the same routing track and with the same photomask designation be spaced at a distance that is greater than or equal to a minimum line-end spacing value 406D.

Figure 4E:
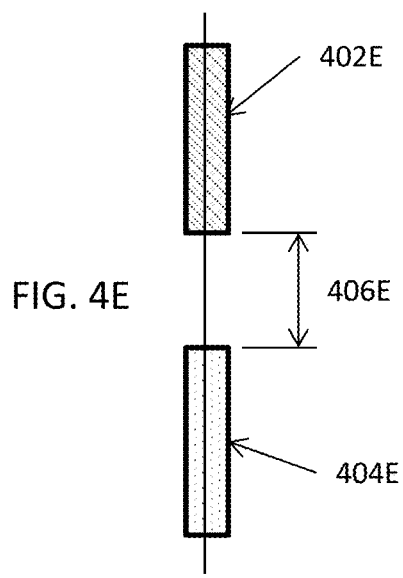
Figure 4F:
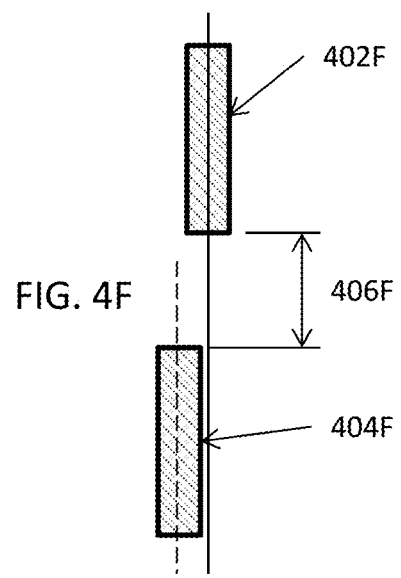

FIG. 4E illustrates the same track, different color line end spacing design rule which requires that the two facing line ends of two wire segments 402E and 404E along the same routing track but with different photomask designations be spaced at a distance that is greater than or equal to a minimum line-end spacing value 406E. FIG. 4F illustrates the different track, same color line end spacing design rule which requires that the two facing line ends of two wire segments 402F along the first track and 404F along the second routing track with same photomask designation be spaced at a distance that is greater than or equal to a minimum line-end spacing value 406F.

Figure 4G:
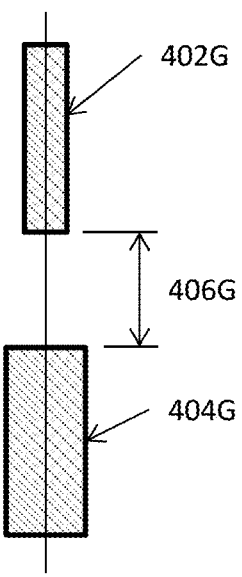
Figure 4H:
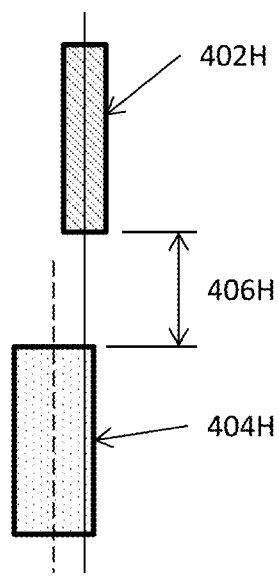

FIG. 4G illustrates the same track, same color, different width line end spacing design rule which requires that the two facing line ends of two wire segments 402G having a first width and 404G having a second width along the same routing track and with the same photomask designation be spaced at a distance that is greater than or equal to a minimum line-end spacing value 406G. FIG. 4H illustrates the different track, different color line end spacing design rule which requires that the two facing line ends of two wire segments 402H along the first track and 404H along the second routing track but with different photomask designation be spaced at a distance that is greater than or equal to a minimum line-end spacing value 406H.

Figure 4I:
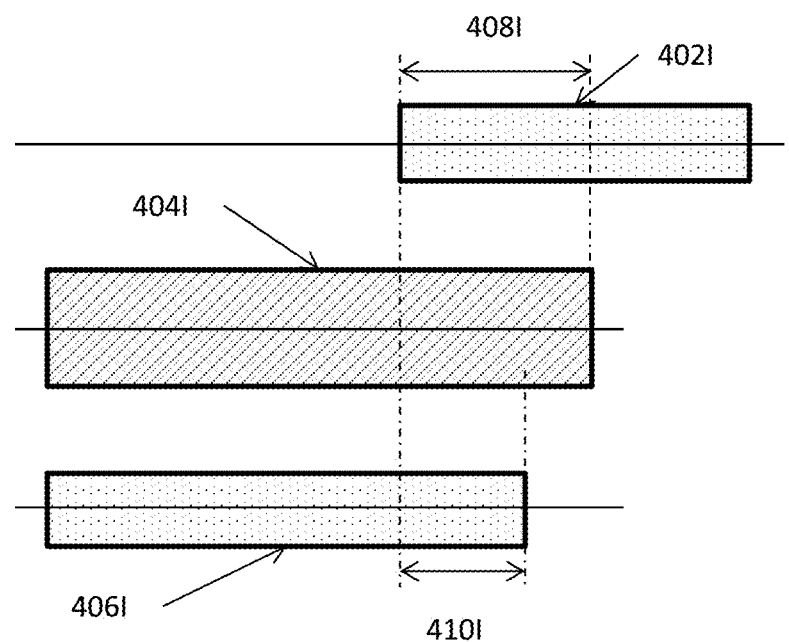

FIG. 4I illustrates a keep-out design rule. In FIG. 4I, the first wire segment 402I and the third wire segment 406I have the same photomask designation, and the second wire segment 404I has a different photomask designation. Each wire segment is associated with its respective width, and the three-track combination with three respective widths satisfies the triplet design rule. The keep-out rule requires that the overlapping line end of the first wire segment 402I is at a distance that is greater than or equal to the keep-out distance 408I from the overlapping line end of the second wire segment 404I. The keep-out rule also requires that the line end of the other adjacent wire segment 406I of the second wire segment 404I is at a distance that is greater than or equal to the "next neighbor keep-out" distance 410I from the overlapping line end of the second wire segment 404I. The "next neighbor keep-out" distance 410I may be dependent on the width of the second wire segment 404I in some embodiments.

FIGS. 5A-M illustrate some examples for application of some techniques for implementing electronic design layouts with symbolic representations to some simplified layout portions in one or more embodiments. More specifically, FIG. 5A illustrates a portion of a simplified layout including two groups of shapes that sandwich a space in between the two groups of shapes. The first group of shapes includes shape 502A belonging to the first mask and shape 504A belonging to the second mask, and the second group of shapes includes shape 506A belonging to the first mask and 508A belonging to the second mask. FIG. 5A further illustrates three possible ways to identify the fill distances—512A, 514A, and 516A where the Diophantine equation may be modified accordingly to reflect the combinations of widths values and spacing values. Various techniques described herein may automatically insert the lateral fill shapes 510A while complying with the track pattern design rules, the multiple patterning design rules, etc.

Figure 5C:
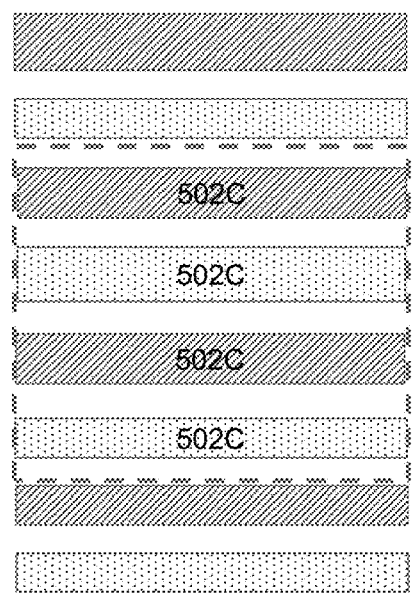

FIG. 5B illustrates a portion of a simplified layout including two groups of shapes where the first group includes at least shape 502B, and the second group includes at least shape 504B. The two groups of shapes sandwich a space 506B. FIG. 5C schematically illustrates the automatic insertion of four lateral fill shapes 502C with the legal spacing value(s) and correct photomask designations within the space 506B in FIG. 5B.

Figure 5D:
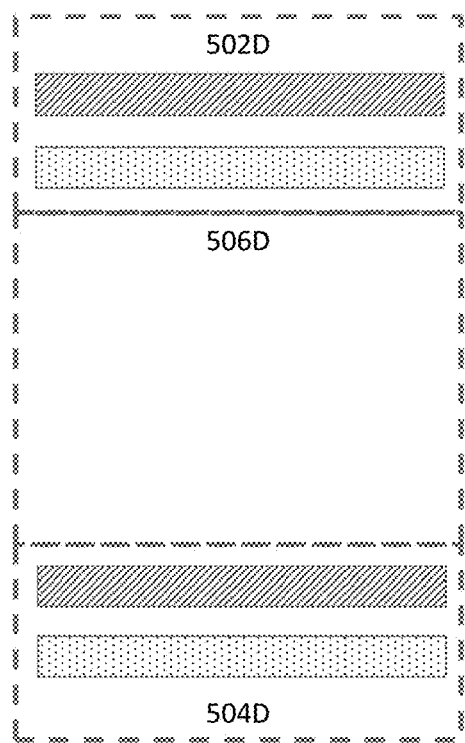
Figure 5E:
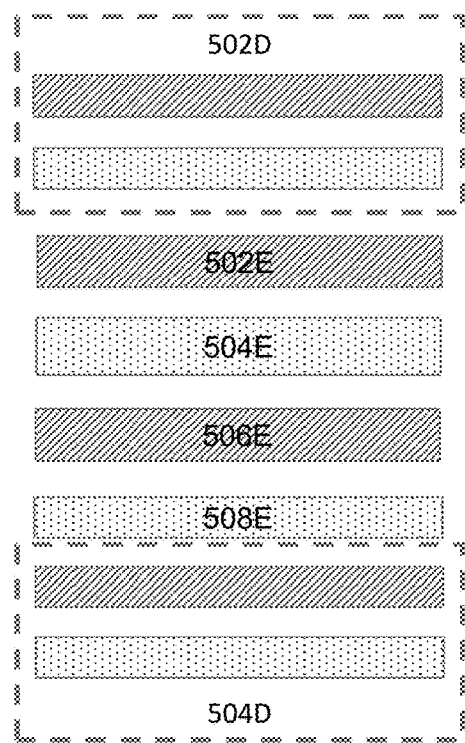

FIG. 5D illustrates a portion of a simplified layout including two groups of shapes—the first group 502D and the second group 504D. The two groups 502D and 504D belong to regions each associated with its own track pattern. The two groups 502D and 504D sandwich a space 506D in which one or more lateral fill shapes may be automatically inserted with various techniques described herein. FIG. 5E illustrates the automatic insertion of four lateral fill shapes 502E, 504E, 506E, and 508E that comply with the multiple patterning design rules (e.g., photomask designations) and track pattern design rules (e.g., minimum length design rule, end of line keep-out design rule, etc.).

Figure 5F:
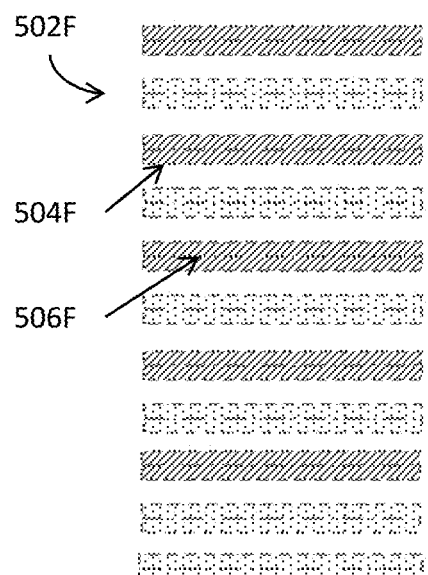

FIG. 5F illustrates a set of routing tracks 502F in a portion of a simplified layout. The routing tracks are represented as rectangles with dashed line boundaries as illustrated by 504F. It shall be noted that a routing track represents a reference line and has no thickness. A routing track may nevertheless be associated with one or more width values such that one or more shapes implemented along the routing track inherit at least one of these one or more width values. Therefore, the fat that FIG. 5F illustrates the routing tracks as rectangles does not explicitly or implicitly indicate that a routing track may have any width.

Figure 5G:
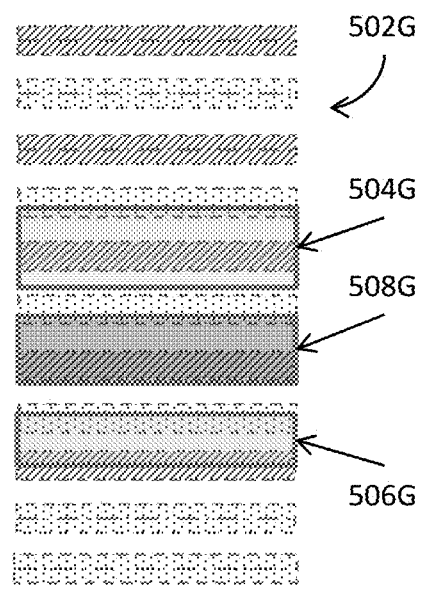

In some embodiments, a routing track may be represented as a line as illustrated by 506F. FIG. 5G illustrates the same portion 502G of the simplified layout with the addition of three shapes 504G, 506G, and 508G. One or more of these three shapes may be interactively inserted by, for example, a designer manipulating the layout portion during an interactive layout editing session. These three shapes belong to two photomasks for multiple patterning purposes. For example, shapes 504G and 506G may belong to the first photomask, and shape 508G may belong to the second photomask.

Figure 5I:
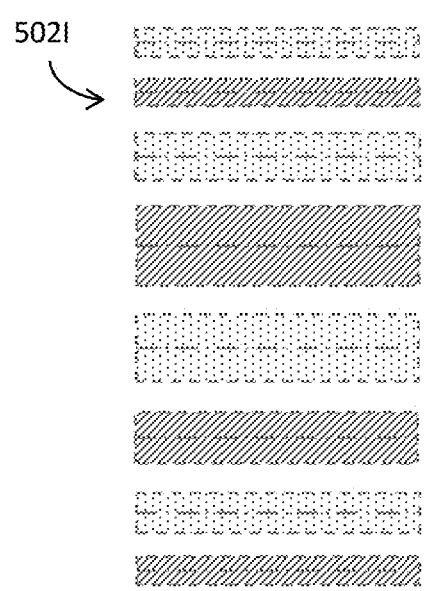
Figure 5H:
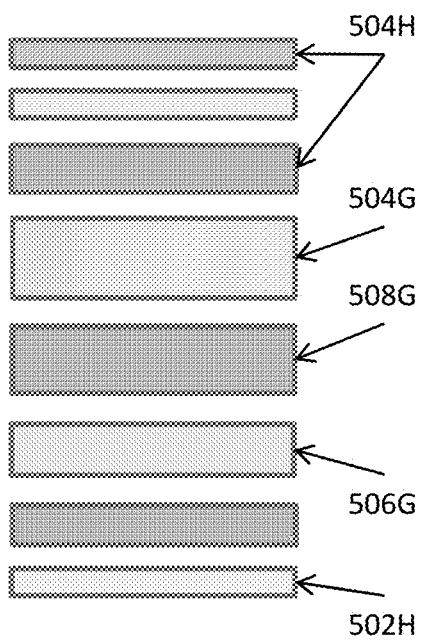

FIG. 5H illustrates the automatic insertion of lateral fill shapes 502H belonging to the first photomask and 504H belonging to the second photomask based on the inserted shapes 504G, 506G, and 508G. In this example illustrated by the FIGS. 5F-I, the initial track pattern illustrated in FIG. 5F does not accommodate the subsequently inserted shapes 502G, 504G, and 506G. The track pattern processing mechanism, the track pattern generation mechanism, or the track pattern evaluation mechanism may thus identify another track pattern 502I*i* as illustrated in FIG. 5I to accommodate the three inserted shapes and implement the lateral fill shapes 502H and 504H as illustrated in FIG. 5H.

Figure 5J:
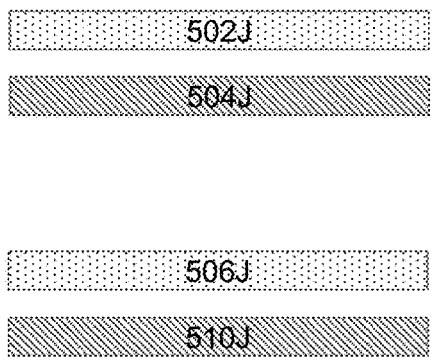
Figure 5L:
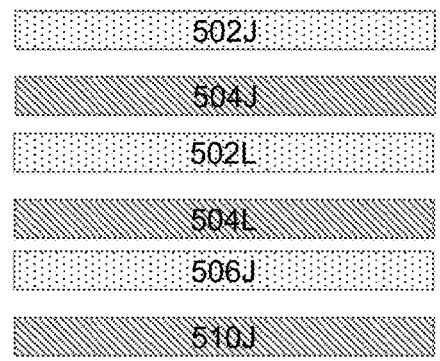

FIG. 5J illustrates two track pattern groups including four existing shapes where shapes 502J and 506J belong to the first photomask, and shapes 504J and 510J belong to the second photomask. FIG. 5L illustrates the identification of a legal track pattern that accommodates the existing shapes 502J, 504J, 506J, and 510J. The legal track pattern includes two additional routing tracks between shapes 504J and 506J. The lateral fill mechanism may insert three lateral fill shapes along these two routing tracks while satisfying the track pattern design rules for a legal arrangement of routing tracks as well as the multiple patterning design rule prohibiting color conflicts between two immediately neighboring shapes.

For example, shapes 506J and 504L respectively belong to the second photomask and the first photomask, and shapes 504J and 502L respectively belong to the second photomask and the first photomask. In this example illustrated in FIG. 5L, it may be determined that the fill distance between 504J and 506J is insufficient for two or more lateral fill shapes (e.g., 502L and 504L) although the fill distance requires an even number of lateral fill shapes due to different photomask designations for shapes 504J and 506J. In this example, a design rule violation may be flagged.

Figure 5K:
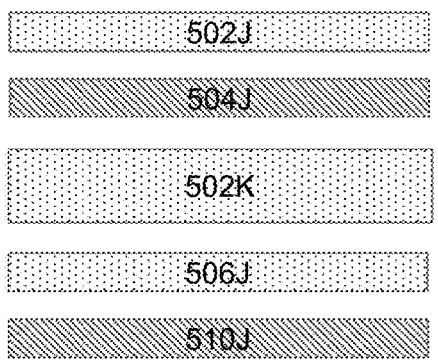

FIG. 5K illustrates the identification of another legal track pattern that also accommodates the existing shapes 502J, 504J, 506J, and 510J. Nonetheless, this legal track pattern may be ruled out of the legal track pattern candidates by one or more track pattern mechanisms (e.g., the track pattern evaluation mechanism, the track pattern processing mechanism, the track pattern generation mechanism, etc.) because of the inclusion of an odd number of routing tracks (one routing track in this example) for the space sandwiched by two shapes having different photomask designations. In the example illustrated in FIG. 5K, shape 502K has the same mask designation either as shape 506J or as shape 504J. Either way, the generated layout causes a color conflict between two immediately neighboring shapes and is thus illegal. In some embodiments where the space sandwiched by two shapes the same photomask designation, any track patterns having an even number of routing tracks may also be ruled out from the legal track pattern candidates. If the lateral fill pattern is nevertheless generated in memory as FIG. 5K illustrates, a design rule violation (e.g., color conflict) may be generated.

Figure 5M:
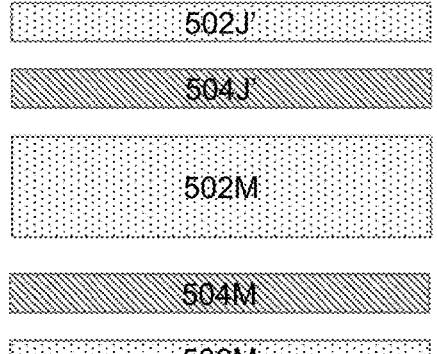

In some of these embodiments, the legal track pattern as shown in FIG. 5K may nevertheless be used to generate a legal layout portion by flipping the photomask designations of shapes 506J and 510J. More specifically, as shown in FIG. 5M, the layout portion may now include shape 502J' associated with the same photomask designation as shape 502J and shape 504J associated with the same photomask designation as shape 504J. The layout portion now includes shape 504M belonging to the second photomask and shape 506M belonging to the first photomask designation, unlike the original shapes 506J and 510J respectively belonging to the first photomask designation and the second photomask designation.

With an odd number of routing tracks in the track pattern (one routing track in this example), the track pattern is a legal track pattern candidate if the two shapes immediately neighboring the space can be colored with the same photomask designation. In some embodiments, the lateral fill shape 502M may be checked to determine whether or not the arrangement of these five shapes and hence the corresponding routing tracks is legal by examining the width and spacing values of shape 502M (or its corresponding routing track) with respect to the two neighboring shapes 504J' and 504M (or their corresponding routing tracks). If the lateral fill shape is determined to be illegal (e.g., the width of shape 502 is impermissible, the width of shape 502 is permissible yet leaving insufficient spacing values for one or both neighboring shapes), a design rule violation may be generated, and further fixing operations may be performed to correct this design rule violation.

With various techniques described herein, some embodiments may select a legal track pattern and insert lateral fill shapes along the routing tracks in the track pattern according to various multiple-patterning design rules, metal density rules, or other pertinent design rules, etc. The insertion of the lateral fill shapes may be based in part upon the design components in the neighboring region(s) on the same layer or even on one or both adjacent layers of the electronic design. Lateral fills shapes may include shapes such as dummy metal fill shapes that are inserted in a region along one or more routing tracks between two shapes residing on two different routing tracks in a layout according to various design rules or constraints.

For example, a layout may include two shapes respectively residing on the first routing tracks and the second routing track that sandwich one or more routing tracks. One or more lateral fill shapes may be inserted along at least one of these one or more routing tracks between the first and the second routing tracks according various design rules governing track patterns and/or multiple-patterning mask designs. In some embodiments, the approaches described herein may insert lateral fill shapes to ensure that the generated layout complies with design rules including, for example, track pattern design rules, minimum spacing design rules, width rules, etc.

Fill shapes may also include lateral fill shapes that are addressed in the second invention. Lateral fill shapes include fill shapes that are inserted along a routing track based in whole or in part upon one or more existing shapes along the same routing track or one or more other shapes along other routing track(s) to satisfy various design rules or constraints governing track patterns and/or multiple-patterning mask designs. In some embodiments, the approaches described herein may insert lateral fill shapes to ensure that the generated layout complies with design rules including, for example, keep-out design rules, minimum-length design rules, etc.

Because legal track patterns are determined while accommodating various multiple-pattern design rules, these lateral fill shapes are thus inserted while complying with these multiple-pattern design rules. In addition, these fill shapes are inserted with the correct mask designations. For example, the routing tracks in the legal track pattern may be pre-designated with the respective mask "colors" in some embodiments even when no shapes have been implemented along the routing tracks. The metal fill shapes may also be "colored" based upon the coloring of the first and the second shapes so that the metal fill shapes have correct mask designations for lithography in some other embodiments. For example, if the first shape along the first routing track has the color B in a double-patterning design, the metal fill shapes along the neighboring second routing track will assume the color C, and the metal fill shapes along the neighboring third routing track will again assume the color B, etc.

Before, during, or shortly after the insertion of lateral fill shapes, the lateral fill shapes may be further checked against a set of design rules, in addition to the multiple-pattern design rules, to ensure that the resultant design satisfies governing design rules. That is, the techniques described herein may modify one or more lateral fill shapes to ensure that the lateral fill shapes comply with this addition set of design rules. For example, a lateral fill shape may be checked against the minimum length rule and the keep-out rule and extend the lateral fill shape to comply with these design rules, if necessary.

More specifically, the techniques described herein may identify one or more multiple-patterning design rules for an electronic design rule. The one or more design rules include, for example but not limited to, a minimum spacing design rule governing the minimum spacing between two adjacent wires, design rules governing which tracks associate with associated with certain widths may be situated immediately adjacent to another track associated with a width (e.g., pair rules or BC rules where B stands for blue and C stands for cyan in double patterning governing which two-width combinations are legal or triplet rule or BCB rule governing which three-width combinations are legal, etc.)

Assuming the electronic design includes a region having a first shape, a second shape spaced from the first shape by the fill distance may be created or modified in the region. The space between the first shape and the second shape may be identified, and it may be further assumed that the space is unoccupied in some embodiments. It shall be noted that the same approach may also apply to some other embodiments where the space includes a third shape between the first shape and the second shape. In some of these embodiments, the space may be further partitioned into two sub-space where the first sub-space is situated between the first shape and the third shape, and the second sub-shape between the third shape and the second shape. For the ease and sole purpose of explanation, it is assumed that the space between the first shape and the second shape is unoccupied.

One or more legal candidate track patterns for the region may be determined from a set of legal track patterns based in part or in whole upon the spacing value between the first and the second shapes. In some embodiments, the spacing value may be termed as a fill distance which may represent the spacing between two opposite ends of the first and the second shapes or the spacing between the two parallel yet non-coincident first and second shapes. In these embodiments, a legal track pattern comprises a permissible arrangement of a group of routing tracks associated with permissible, respective widths of interconnect segments when these interconnect segments are implemented along the group of routing tracks. For example, the set of legal track patterns may be provided by a foundry, and each track pattern includes a unique, predetermined arrangement of tracks each of which is associated with a permissible width value. A routing itself is, however, a fictitious line having zero thickness and is used to guide an EDA tool (e.g., a router) to implement (e.g., route) an electronic design. For example, a router may insert an interconnect segment along in such a way that the centerline of the interconnect segment is aligned with the routing track.

In some embodiments where more than one legal candidate track patterns are determined for the region, a final track pattern may be determined from the one or more legal candidate track patterns by using at least a cost function. A cost function may evaluate the cost of having a particular legal track pattern assigned to the region, and the legal candidate track pattern associated with the lowest cost may be determined as the final legal track pattern. The cost function may determine the cost of a particular legal track pattern based in part or in whole upon the routing tracks in the legal track pattern itself. For example, the cost function may associate a higher cost to a track pattern having a routing track associated with a smaller width value in some embodiments favoring wider routing tracks which provide more flexibility and may carry higher currents in routing an electronic design. It shall be noted that other weighting or scoring functions may also be used in place of or in addition to the cost function in some embodiments.

The region may thereby be implemented with one or more fill shapes along at least one routing track in the final legal track pattern while automatically satisfying those identified one or more multiple-patterning design rules. The one or more fill shapes comprise the width value associated with the at least one routing track. For example, if a first fill shape is implemented along a first routing track associated with a first width value, and a second fill shape along a second routing track associated with a second width value, the first fill shape will have the first width value, and the second shape will have the second width value, when implemented along these two routing tracks.

In another aspect, one or more additional design rules may be brought into consideration, and at least one fill shape of the one or more fill shapes will be modified before, during, or after the insertion of the at least one fill shape so the region also satisfies these one or more addition design rules. The one or more additional design rules may include, for example, a minimum length rule governing the minimum length required for an interconnect segment, a same track line-end design rule, a different track line-end design rule, a keep-out design rule, etc. Modifications to a fill shape may include, for example, extending the fill shape, trimming the fill shape, or merging the fill shape with another shape, etc.

System Architecture Overview

Figure 6:
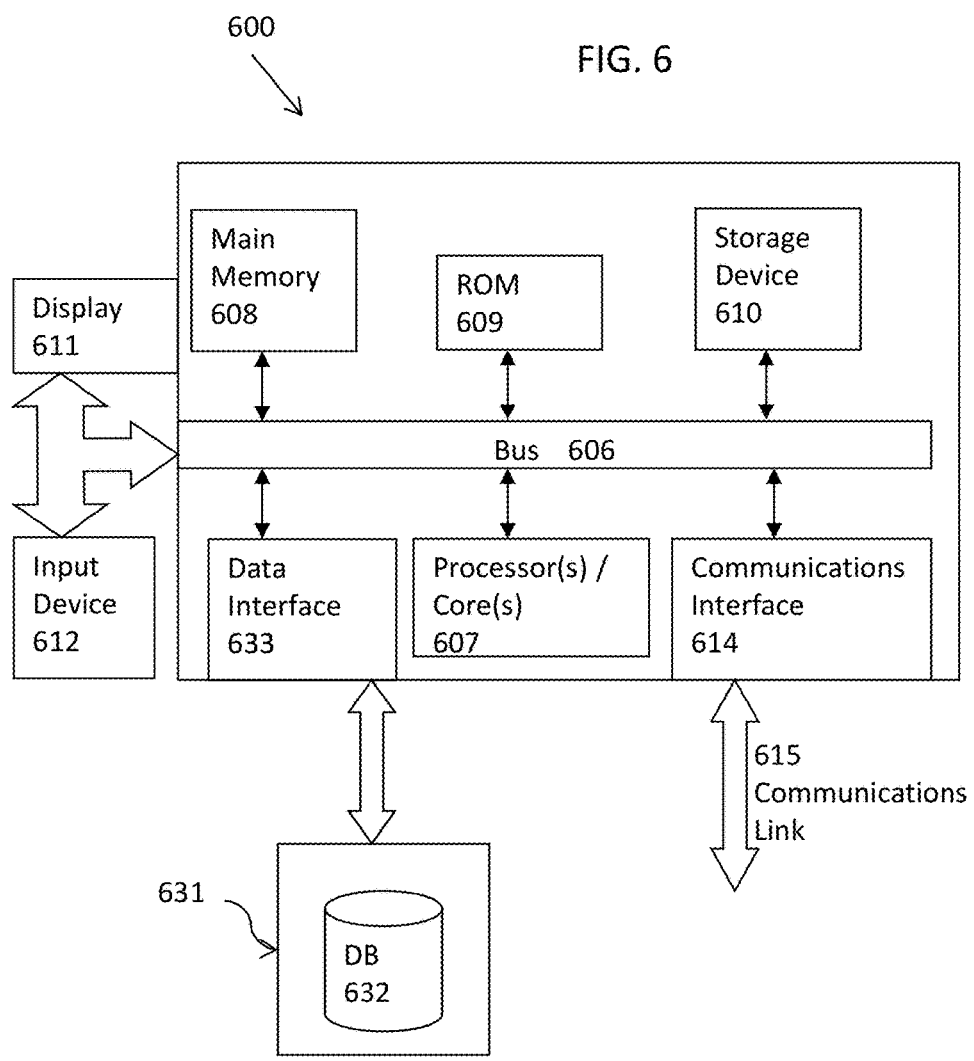
FIG. 6 illustrates a computerized system on which a method for implementing DRC clean multi-patterning process nodes with lateral fills in electronic designs may be implemented.

FIG. 6 illustrates a block diagram of an illustrative computing system 600 suitable for implementing DRC clean multi-patterning process nodes with lateral fills in electronic designs as described in the preceding paragraphs with reference to various figures. Computer system 600 includes a bus 606 or other communication mechanism for communicating information, which interconnects subsystems and devices, such as processor(s) or processor core(s) 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown).

According to one embodiment, computing system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A mechanisms described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor(s) or processor core(s) 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, i.e., application code, through communication link 615 and communication interface 614. Received program code may be executed by processor(s) or processor core(s) 607 as it is received, and/or stored in disk drive 610, or other non-volatile storage for later execution. In an embodiment, the computing system 600 operates in conjunction with a data storage system 631, e.g., a data storage system 631 that includes a database 632 that is readily accessible by the computing system 600. The computing system 600 communicates with the data storage system 631 through a data interface 633. A data interface 633, which is coupled with the bus 606, transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing DRC (design rule check) clean multi-patterning process nodes with lateral fills in an electronic design, comprising:
   identifying legal track patterns and one or more design rules that govern multiple patterning and the legal track patterns by accessing a rule deck to retrieve the one or more design rules, wherein
      the legal track patterns respectively comprise corresponding sets of one or more routing tracks that are arranged based at least in part upon one or more respective permissible width values for the one or more routing tracks;
   identifying, at a layout editing mechanism including or coupled with at least one micro-processor of a computing system and further coupled with an input/output (I/O) mechanism of the computing system, a first shape and a second shape by using the layout editing mechanism that examines design data of a portion of the electronic design to determine the first and the second shapes that sandwich a space and one or more characteristics of the first and the second shapes;
   inserting one or more lateral fill shapes for the space at a lateral fill mechanism that implements the one or more lateral fill shapes along one or more respective routing tracks in a legal track pattern for the space sandwiched by the first and second shapes while complying with the one or more design rules; and
   performing one or more post-layout operations on the layout including the one or more lateral fill shapes to improve the layout and to prepare the layout for manufacturing.

2. The computer implemented method of claim 1, further comprising:
   identifying a first set of one or more tracks corresponding to the first shape and a second set of one or more tracks corresponding to the second shape;
   identifying one or more first width values of the first set of one or more tracks and one or more second width values of the second set of one or more tracks; and
   identifying one or more first photomask designations of the first set of one or more tracks and one or more second photomask designations of the second set of one or more tracks.

3. The computer implemented method of claim 2, further comprising:
   identifying a fill distance for the space by using the layout editing mechanism to identify two opposing edges of the first shape and the second shape and determine the fill distance between the two opposing edges; and
   determining whether lateral fill is to be performed for the one or more lateral fill shapes by using a track pattern evaluation mechanism to examine the fill distance against one or more criteria to determine whether the fill distance triggers the lateral fill.

4. The computer implemented method of claim 1, further comprising:
   determining one or more legal track pattern candidates for the space based in part or in whole upon the one or more characteristics, wherein
      the one or more characteristics comprise a first width of the first shape and a second width of the second shape,
      a legal track pattern candidate comprises a plurality of routing tracks associated with a permissible arrangement of width values, and
      a track of the one or more tracks comprising a fictitious line or line segment along which one or more shapes of the electronic design are implemented; and
   determining a legal track pattern by using a track pattern evaluation mechanism or a track pattern generation mechanism that examines the one or more legal track pattern candidates against one or more criteria.

5. The computer implemented method of claim 4, further comprising:
   pre-coloring one or more tracks in the legal track pattern by using the track pattern processing mechanism that references the one or more design rules and assigns one or more photomask designations to the one or more tracks based in part upon a first photomask designation of the first shape or a second photomask designation of the second shape.

6. The computer implemented method of claim 4, further comprising:
   identifying one or more tracks in the legal track pattern that correspond to the one or more lateral fill shapes; and
   determining, at the layout editing mechanism, one or more widths for the one or more lateral fill shapes or associated with the one or more tracks corresponding to the one or more lateral fill shapes.

7. The computer implemented method of claim 6, further comprising:
   determining one or more photomask designations for the one or more lateral fill shapes by referencing a first photomask designation of the first shape or a second photomask designation of the second shape to determine the one or more photomask designations based in part upon the one or more design rules.

8. The computer implemented method of claim 6, further comprising:
   identifying one or more shape ends of the one or more lateral fill shapes by examining the design data of the one or more lateral fill shapes; and
   modifying at least one shape end of the one or more shape ends of the one or more lateral fill shapes by examining the one or more design rules against the at least one shape end and extending or trimming the at least one shape end based in part upon examination results.

9. The computer implemented method of claim 1, further comprising:
   identifying a lateral fill shape in the space of the layout by inquiring into an electronic design database to retrieve the lateral fill shape; and
   identifying a sliced line segment for the lateral fill shape by projecting shape ends of the lateral fill shape onto a reference line or by projecting the lateral fill shape onto the reference line to form projected shape ends for the sliced line segment.

10. The computer implemented method of claim 9, further comprising:
    identifying one or more slices in which the lateral fill shape is located by comparing slice lines of the one or more slices to the shape ends of the lateral fill shape; and identifying one or more existing sliced line segments in the one or more slices by examining dictionary entries in a shape dictionary.

11. The computer implemented method of claim 10, further comprising:
partitioning at least one existing sliced line segment of the one or more existing sliced line segments into multiple sliced line sub-segments by subdividing the at least one existing sliced line segment with at least one projected shape end of the projected shape ends along the sliced line segment;
updating the shape dictionary by revising at least one dictionary entry of the dictionary entries with data corresponding to the multiple sliced line sub-segments; and
associating the at least one dictionary entry with the first shape or the second shape.

12. The computer implemented method of claim 1, wherein the one or more design rules includes an implied design rule that is not explicitly specified in the rule deck.

13. A system for implementing DRC (design rule check) clean multi-patterning process nodes with lateral fills in an electronic design, comprising:
a plurality of mechanisms, at least one of which comprises or is coupled with at least one processor or a processor core that executes one or more threads in a computing system;
a non-transitory computer accessible storage medium storing thereupon program code that includes a sequence of instructions that, when executed by the at least one micro-processor or processor core of a computing system, causes the at least one micro-processor or processor core at least to:
identify legal track patterns and one or more design rules that govern multiple patterning and the legal track patterns by accessing a rule deck to retrieve the one or more design rules, wherein
the legal track patterns respectively comprise corresponding sets of one or more routing tracks that are arranged based at least in part upon one or more respective permissible width values for the one or more routing tracks;
identify, at a layout editing mechanism including or coupled with the at least one processor or processor core and further coupled with an input/output (TO) mechanism of the computing system, a first shape and a second shape by using the layout editing mechanism that examines design data of a portion of the electronic design to determine the first and the second shapes that sandwich a space and one or more characteristics of the first and the second shapes;
insert one or more lateral fill shapes for the space at a lateral fill mechanism that implements the one or more lateral fill shapes along one or more respective routing tracks in a legal track pattern for the space sandwiched by the first and second shapes while complying with the one or more design rules; and
perform one or more layout operations on the layout including the one or more lateral fill shapes to improve the layout and to prepare the layout for manufacturing.

14. The system of claim 13, wherein the non-transitory memory holds the program code, and the program code includes further instructions that, when executed by the at least one micro-processor or processor core, cause the at least one processor or processor core to:

identify a first set of one or more tracks corresponding to the first shape and a second set of one or more tracks corresponding to the second shape;
identify one or more first width values of the first set of one or more tracks and one or more second width values of the second set of one or more tracks;
identify one or more first photomask designations of the first set of one or more tracks and one or more second photomask designations of the second set of one or more tracks;
identify a fill distance for the space by using the layout editing mechanism to identify two opposing edges of the first shape and the second shape and determine the fill distance between the two opposing edges; and
determine whether lateral fill is to be performed by using a track pattern evaluation mechanism to examine the fill distance against one or more criteria to determine whether the fill distance triggers the lateral fill.

15. The system of claim 13, wherein the non-transitory memory holds the program code, and the program code includes further instructions that, when executed by the at least one processor or processor core, causes the at least one micro-processor or processor core to:
determine one or more legal track pattern candidates for the space based in part or in whole upon the one or more characteristics, wherein the one or more characteristics comprise a first width of the first shape and a second width of the second shape; and
determine a legal track pattern to examine the one or more legal track pattern candidates against one or more criteria.

16. The system of claim 15, wherein the non-transitory memory holds the program code, and the program code includes further instructions that, when executed by the at least one processor or processor core, causes the at least one micro-processor or processor core to:
pre-color one or more tracks in the legal track pattern to reference the one or more design rules and assign one or more photomask designations to the one or more tracks based in part upon a first photomask designation of the first shape or a second photomask designation of the second shape;
identify one or more tracks in the legal track pattern that correspond to the one or more lateral fill shapes; and
determine one or more widths for the one or more lateral fill shapes or associated with the one or more tracks corresponding to the one or more lateral fill shapes.

17. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing DRC (design rule check) clean multi-patterning process nodes with lateral fills in an electronic design, the set of acts comprising:
identifying legal track patterns and one or more design rules that govern multiple patterning and the legal track patterns by accessing a rule deck to retrieve the one or more design rules, wherein
the legal track patterns respectively comprise corresponding sets of one or more routing tracks that are arranged based at least in part upon one or more respective permissible width values for the one or more routing tracks;
identifying, at a layout editing mechanism including or coupled with the at least one processor or processor core and further coupled with an input/output (TO) mechanism of the computing system, a first shape and a second shape by using the layout editing mechanism that examines design data of a portion of the electronic design to determine the first and the second shapes that sandwich a space and one or more characteristics of the first and the second shapes;

inserting one or more lateral fill shapes for the space at a lateral fill mechanism that implements the one or more lateral fill shapes along one or more respective routing track in a track pattern for the space sandwiched by the first and second shapes while complying with the one or more design rules; and performing one or more layout operations on the layout including the one or more lateral fill shapes to improve the layout and to prepare the layout for manufacturing.

18. The article of manufacture of claim 17, the set of acts further comprising:

identifying one or more tracks in the legal track pattern that correspond to the one or more lateral fill shapes;

determining one or more widths for the one or more lateral fill shapes or associated with the one or more tracks corresponding to the one or more lateral fill shapes; and determining one or more photomask designations for the one or more lateral fill shapes by referencing a first photomask designation of the first shape or a second photomask designation of the second shape to determine the one or more photomask designations based in part upon the one or more design rules.

19. The article of manufacture of claim 17, the set of acts further comprising:

identifying a lateral fill shape in the space of the layout by inquiring into an electronic design database to retrieve the lateral fill shape;

identifying a sliced line segment for the lateral fill shape by projecting shape ends of the lateral fill shape to form projected shape ends or by projecting the lateral fill shape onto a reference line;

identifying one or more slices in which the lateral fill shape is located by comparing slice lines of the one or more slices to the shape ends of the lateral fill shape; and identifying one or more existing sliced line segments in the one or more slices by examining dictionary entries in a shape dictionary.

20. The article of manufacture of claim 17, the set of acts further comprising:

partitioning at least one existing sliced line segments of the one or more existing sliced line segments into multiple sliced line sub-segments by subdividing the at least one existing sliced line segments with at least one projected shape end of the projected shape ends;

updating the shape dictionary by revising at least one dictionary entry of the dictionary entries with data corresponding to the multiple sliced line sub-segments; and associating the at least one dictionary entry with the lateral fill shape dictionary.

* * * * *